United States Patent
Shimomura

(10) Patent No.: US 6,477,260 B1
(45) Date of Patent: Nov. 5, 2002

(54) POSITION MEASURING APPARATUS USING A PAIR OF ELECTRONIC CAMERAS

(75) Inventor: Noriko Shimomura, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/426,952

(22) Filed: Oct. 26, 1999

(30) Foreign Application Priority Data

Nov. 2, 1998 (JP) .............................. 10-311903

(51) Int. Cl.[7] ............................. G06K 9/00; B60Q 1/00
(52) U.S. Cl. ....................................... 382/106; 340/435
(58) Field of Search .............................. 382/106, 104, 382/286, 199; 340/435, 901; 701/301, 302; 348/113, 116, 139, 140, 141, 142, 143, 169

(56) References Cited

U.S. PATENT DOCUMENTS

| | | | | |
|---|---|---|---|---|
| 5,557,323 A | * | 9/1996 | Kajiwara | 348/140 |
| 5,606,627 A | * | 2/1997 | Kuo | 348/159 |
| 6,021,209 A | * | 2/2000 | Hirabayashi et al. | 382/106 |
| 6,252,974 B1 | * | 6/2001 | Martens et al. | 382/107 |
| RE37,610 E | * | 3/2002 | Tsuchiya et al. | 382/106 |

* cited by examiner

Primary Examiner—Joseph Mancuso
Assistant Examiner—Martin Miller
(74) Attorney, Agent, or Firm—Foley & Lardner

(57) ABSTRACT

A distance measuring apparatus applicable to a mobile body such as an automotive vehicle which detects a position of an obstacle (a target object) without influence of an ambient environment such as a white line and determines positions of lateral ends of the obstacle is disclosed. In the distance measuring apparatus, a pair of electronic cameras are mounted on the mobile body, optical axes of both of the cameras being mutually parallel to each other and being directed toward a forward direction or toward a rearward direction and horizontal axes of their photograph planes being aligned to the same line. Using a new stereophotographic image processing, deriving a parallax for each window from a calculated difference in position between one image and another image, voting to each position in a table of parallax x lateral position, calculating a distance to the obstacle on the basis of the value of the parallax at any one of horizontal positions in the table at which a result of voting indicates a higher value, deriving a horizontal range on the one image on the basis of the horizontal positions of respective windows corresponding to any positions in the table at each of which the result of voting indicates the higher value, deriving a vertical range at each end of which a histogram value of histograms indicates a higher value, and, selecting any one of present longitudinal edges located in the vicinity of each end of the horizontal range from among searched longitudinal edges.

10 Claims, 21 Drawing Sheets

FIG.4A
CORRESPONDS TO IMAGE A

LEFT SIDE IMAGE

FIG.4B
CORRESPONDS TO IMAGE B

20

① ② ③ ④ ⑤ ⑥ ⑦ ⑧ ⑨ ⑩ ⑪ ⑫ ⑬ ⑭ ⑮ ⑯ ⑰ ⑱ ⑲ ⑳

RIGHT SIDE IMAGE
(DEFINING 20 × 10 WINDOWS)

} 10

MATCHING FOR EACH WINDOW (NOTE 7)

A SINGLE WINDOW

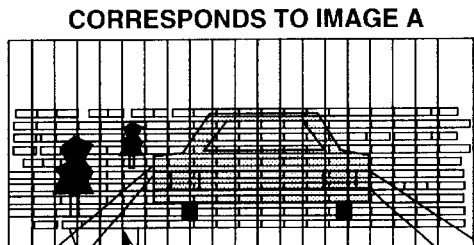

FIG.4D

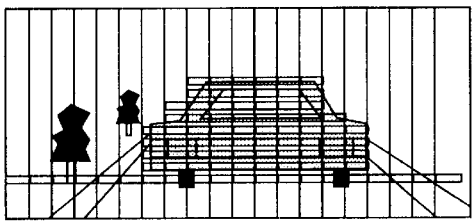

PICKED UP FROM MASSES OF PARALLAX OF 15 WINDOWS

PARALLAX DERIVED FOR EACH WINDOW

① THROUGH ⑳ DENOTE WINDOWS DEFINED IN THE LATERAL DIRECTION
(ANGLES IN THE LATERAL DIRECTION)

PARALLAX DERIVED FOR ALL WINDOWS

① ② ③ ④ ⑤ ⑥ ⑦ ⑧ ⑨ ⑩ ⑪ ⑫ ⑬ ⑭ ⑮ ⑯ ⑰ ⑱ ⑲ ⑳

15, 16, 20,  2, 12, 20, 30, 12,  5,  7, 20,  2, 12, 20, 30, 32, 15, 16, 20,  2
 5, 28, 10,  2,  2,  5, 10, 32, 15, 16, 15, 15, 15, 15, 15, 32, 28, 26,  2, 28
18, 16,  9, 12, 22,  5,  1, 12, 15, 16, 15, 15, 15, 15, 15, 23, 18, 26, 15, 33
12, 12, 19, 19, 33,  5, 31, 12, 15, 15, 15, 15, 15, 15, 15,  3, 28, 26, 15, 13
15, 26, 19, 19, 30,  5, 21, 15, 15, 15, 15, 15, 15, 15, 15, 20, 26,  5, 40
 3, 12, 19, 19, 33, 19, 15, 15, 15, 15, 15, 15, 15, 15, 15,  5, 12, 23, 13
15, 26, 19, 19,  3, 12, 15, 15, 15, 15, 15, 15, 15, 15, 15, 15, 26,  5, 40
 5, 32, 19, 19, 33, 19, 16, 15, 15, 15, 15, 15, 15, 15, 15, 15, 12, 23, 13
15, 26, 19, 19, 15, 15, 15,(15)15, 15, 15, 15, 15, 15, 15, 15, 15, 15, 15, 15
11, 26, 15, 20, 20, 20, 20, 20, 20, 20, 20, 20, 20, 20, 20, 20, 20, 20, 12, 23

SINCE LATERAL POSITION = PARALLAX ACCORDING TO WINDOW ROW OF ⑧ = 15, ADDITION OF +1 IS PERFORMED
LATERAL AXIS OF TABLE = ⑧, LONGITUDINAL AXIS = 15

↓

VOTING PROCESS FOR ALL WINDOWS

TABLE OF PARALLAX × LATERAL POSITION (RESULT OF VOTING)

PARALLAX

FIG.6A

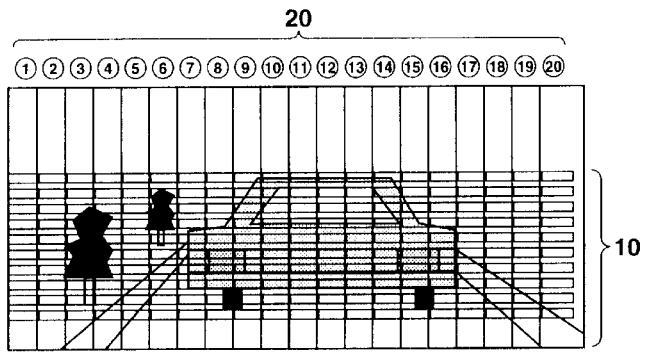

FIG.6B

PARALLAX DERIVED FOR ALL WINDOWS

① ② ③ ④ ⑤ ⑥ ⑦ ⑧ ⑨ ⑩ ⑪ ⑫ ⑬ ⑭ ⑮ ⑯ ⑰ ⑱ ⑲ ⑳

15, 16, 20, 2, 12, 20, 30, 12, 5, 7, 20, 2, 12, 20, 30, 32, 15, 16, 20, 2
5, 28, 10, 2, 2, 5, 10, 32, 15, 16, 15, 15, 15, 15, 15, 15, 32, 28, 26, 2, 28
18, 16, 9, 12, 22, 5, 1, 12, 15, 16, 15, 15, 15, 15, 15, 23, 18, 26, 15, 33
12, 12, 19, 19, 33, 5, 31, 12, 15, 15, 15, 15, 15, 15, 15, 3, 28, 26, 15, 13
15, 26, 19, 19, 30, 5, 21, 15, 15, 15, 15, 15, 15, 15, 15, 20, 26, 5, 40
3, 12, 19, 19, 33, 19, 15, 15, 15, 15, 15, 15, 15, 15, 15, 5, 12, 23, 13
15, 26, 19, 19, 3, 12, 15, 15, 15, 15, 15, 15, 15, 15, 15, 15, 26, 5, 40
5, 32, 19, 19, 33, 19, 16, 15, 15, 15, 15, 15, 15, 15, 15, 15, 12, 23, 13
15, 26, 19, 19, 15, 15, 15, 15, 15, 15, 15, 15, 15, 15, 15, 15, 15, 15, 15
11, 26, 15, 20, 20, 20, 20, 20, 20, 20, 20, 20, 20, 20, 20, 20, 20, 20, 12, 23

PARALLAX FOR A TREE ALONGSIDE OF THE PRECEDING VEHICLE

PARALLAX FOR A TREE AT A DEEPER POSITION THAN THE PRECEDING VEHICLE

PARALLAX FOR A PRECEDING VEHICLE

FIG.6C

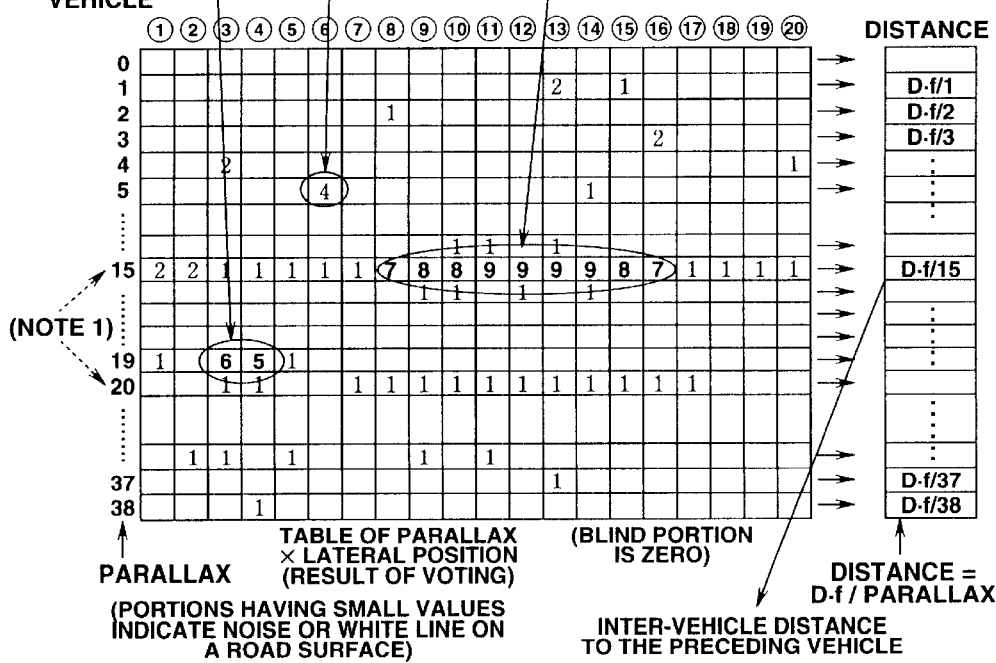

↑
PARALLAX
(PORTIONS HAVING SMALL VALUES INDICATE NOISE OR WHITE LINE ON A ROAD SURFACE)

TABLE OF PARALLAX × LATERAL POSITION (RESULT OF VOTING)

(BLIND PORTION IS ZERO)

INTER-VEHICLE DISTANCE TO THE PRECEDING VEHICLE

DISTANCE = D·f / PARALLAX

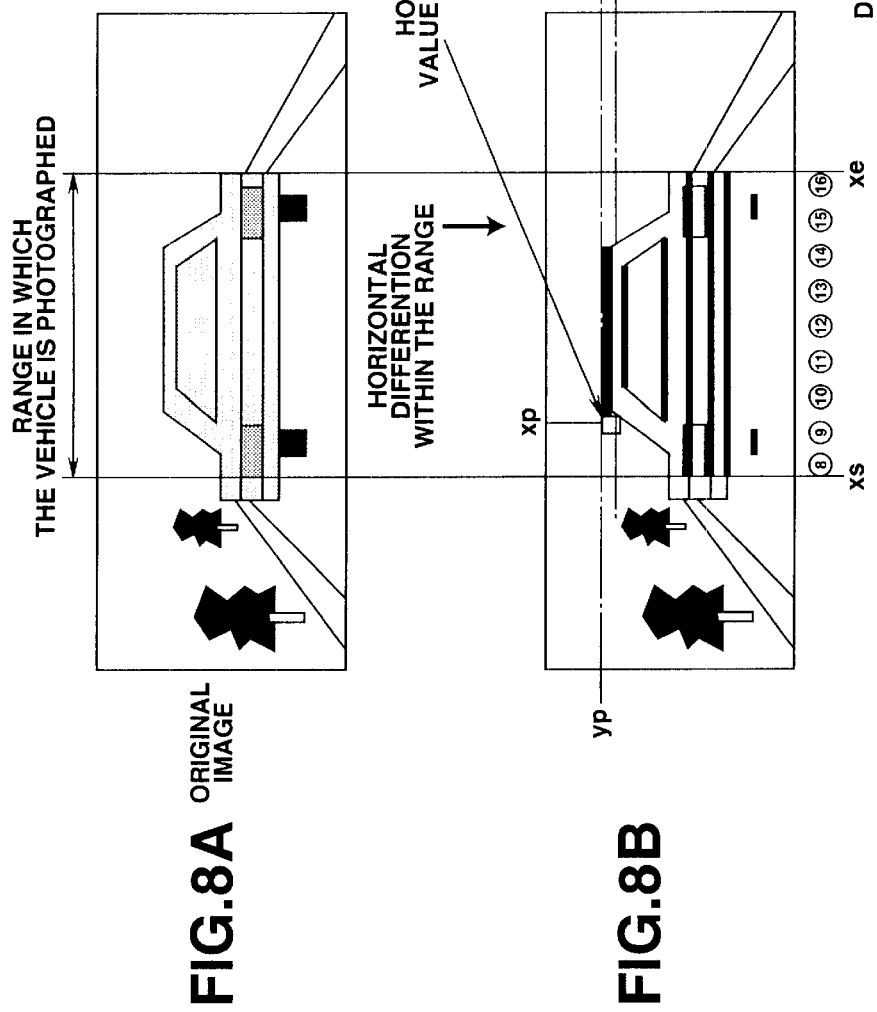

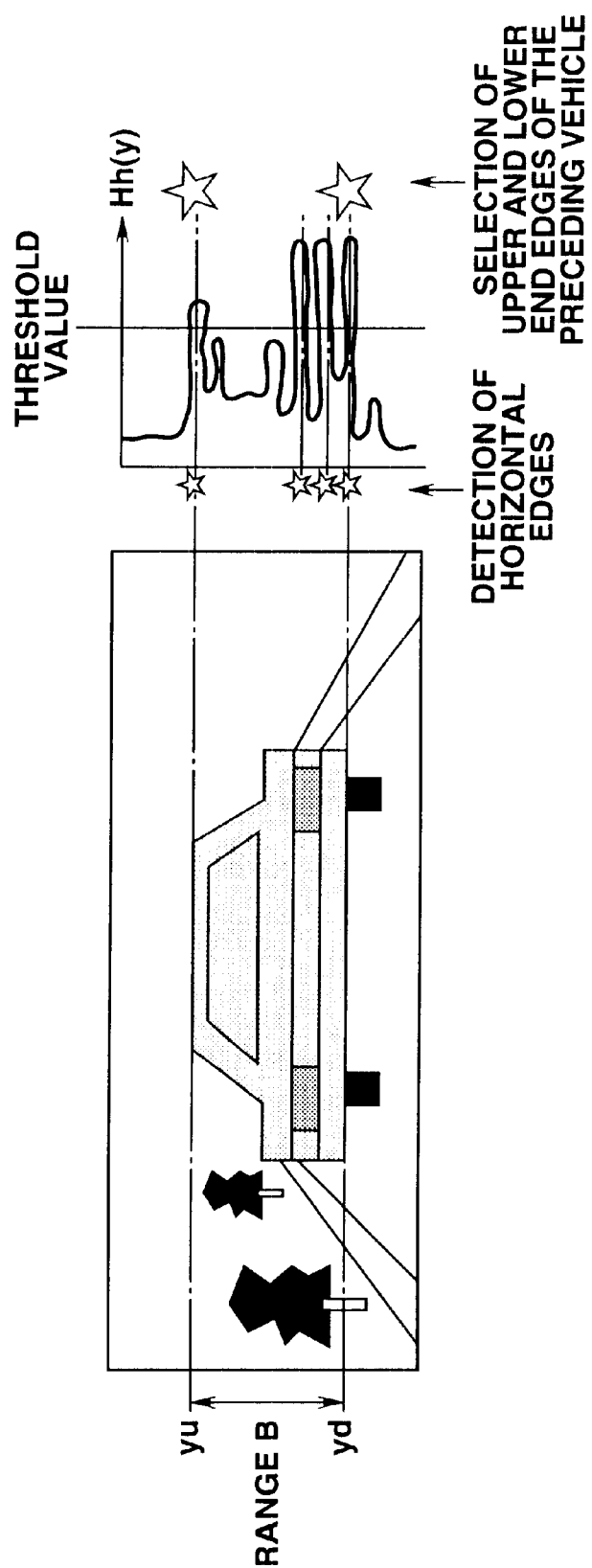

FIG.15A

| $\frac{1}{4}$ | $\frac{1}{2}$ | $\frac{1}{4}$ |
|---|---|---|
| 0 | 0 | 0 |
| $-\frac{1}{4}$ | $-\frac{1}{2}$ | $-\frac{1}{4}$ |

FIG.15B

| $\frac{1}{4}$ | 0 | $-\frac{1}{4}$ |
|---|---|---|
| $\frac{1}{2}$ | 0 | $-\frac{1}{2}$ |
| $\frac{1}{4}$ | 0 | $-\frac{1}{4}$ |

SELECTION OF EDGES PRESENT IN A VICINITY TO RANGE LIMITS BETWEEN RANGE A AND RANGE A'

HISTOGRAM ON EDGES PICKED UP WITHIN RANGE B

THRESHOLD VALUE

DETECTION OF VERTICAL EDGES

RANGE A'
RANGE A

ORIGINAL IMAGE xlr xll          xrr xrl

FIG.20A SELECTED OF EDGES WHICH FALL IN A RANGE CROSSING ▨ AND ▢

(NOTE 5)   (NOTE 6)

FIG.20B

HISTOGRAM OF EDGES PICKED UP WITHIN RANGE B

THRESHOLD VALUE

DETECTION OF VERTICAL EDGES

RANGE A'
RANGE A

VEHICULAR LATERAL ENDS AND SELECTED EDGE

FIG.20C

ORIGINAL IMAGE xlr  xll        xrr  xrl

DETERMINATION OF WHETHER A PASS OF A NARROW STREET IS POSSIBLE

DETECTION OF WHETHER A FORWARD INTERRUPTION IS POSSIBLE IN A CASE WHERE A CONGESTION OCCURS IN FRONT OF A TOLL-GATE

POSITION MEASURING APPARATUS USING A PAIR OF ELECTRONIC CAMERAS

BACKGROUND OF THE INVENTION a) Field of the Invention

The present invention relates generally to a position measuring apparatus applicable to a mobile body such as an automotive vehicle. The present invention, more particularly, relates to a technique which detects a target object (an obstacle) placed in a forward direction (forward detection zone) or rearward direction (rearward detection zone) of the mobile body on which the position measuring apparatus is mounted using a stereophotographic image processing method, which accurately determines a spatial distance to the obstacle and a position of each lateral end of the obstacle without influence of an ambient environment, and which can be applied to an obstacle detecting apparatus for the automotive vehicle, an automatic vehicular velocity controlling apparatus to follow up a preceding vehicle which is running ahead of the vehicle at the same traffic lane, a brake controlling apparatus to avoid a collision against the obstacle, an automatic vehicular steering apparatus, and so forth.

b) Description of the Related Art

A Japanese Patent Application First Publication No. Heisei 8-278126 published on Oct. 22, 1996 exemplifies previously proposed distance measuring apparatus and method applied to an automotive vehicle which detects the obstacle. In the previously proposed distance measuring apparatus and method disclosed in the above-identified Japanese Patent Application Publication, an object to be detected is the preceding vehicle.

The preceding vehicle is usually present over a road surface and many automotive vehicles have long lateral (horizontal) edges on their bodies. Hence, a restriction of a range of search for the object to be detected is placed onto a zone of image above the road surface detected by means of a white line detection (the white line serves to partition traffic lanes). A position of the preceding vehicle on an image is, then, determined by searching for any lateral edges above the road surface and a stereophotographic matching is, thereafter, advanced at the determined position described above to derive a distance to the preceding vehicle.

SUMMARY OF THE INVENTION

However, in the previously proposed method for detecting the obstacle disclosed in the above-described Japanese Patent Application First Publication, a zone of detection for the preceding vehicle is restricted onto above a (front) traffic lane on which the vehicle (on which the above-descried distance measuring apparatus and method are installed) is running and which is detected on the basis of the white line. Hence, the zone above the road surface to detect the preceding vehicle cannot be restricted in a case where the preceding vehicle is running on the traffic lane having no white line or in a case where the preceding vehicle is running on the traffic lane at a close distance to the vehicle so that the white line is partially or wholly hidden. Under such a situation as described above, it becomes impossible to restrict the search range for horizontal (lateral) edges of the preceding vehicle and the detection of the image of the preceding vehicle becomes unstable.

In addition, in the method for detecting the obstacle disclosed in the above-described Japanese Patent Application First Publication, a search for vertical (longitudinal) edges above the road surface is advanced. The stereophotographic matching is carried out using the vertical edge to detect the distance to the preceding vehicle and to detect the position of the preceding vehicle on the image. Then, a position of each horizontal (lateral) end of the preceding vehicle is determined according to an estimation from each vertical end edge present above the road surface. Hence, it is difficult to distinguish each horizontal end of the preceding vehicle from an end of any other objects than the preceding vehicle and its background. Consequently, an accuracy of the detection of the lateral (horizontal) ends of the preceding vehicle is lowered.

It is, therefore, an object to provide a position measuring apparatus which can detect the position of the obstacle with no influence of the ambient environment such as the white line and the position of the vehicle on which the position measuring apparatus is mounted, and can determine the position of the lateral ends of the obstacle to be detected with a high accuracy.

The above-described object can be achieved by providing a position measuring apparatus, comprising: a pair of electronic cameras mounted on a mobile body, optical axes of both of the cameras being mutually parallel to each other and being directed toward a forward direction of the mobile body or toward a rearward direction thereof and horizontal axes of their photograph planes being aligned to the same line; an image split region setting section to split one image photographed by one of the pair of cameras into a plurality of image split regions, each image split region having a predetermined dimension; a parallax calculating section to determine, for each image split region, a similarity in image between an image present within one of the image split regions and another image photographed by the other of the pair of cameras and present on each position corresponding to one of the image split regions and to calculate, for each image split region, a difference in position between a position of each of the image split regions and any one of the positions of the other image at which the similarity in image to the image on the position of each image split region is highest, the parallax calculating section deriving a parallax for each image split region from the calculated difference in position therebetween; a voting section, the voting section including a table whose lateral axis is made correspondence to a horizontal position for each image split region and whose longitudinal axis is made correspondence to a value of the parallax for each image split region and accumulatively adding a predetermined numerical value to each position in the table corresponding to both of the horizontal position of each image split region and a value of the parallax at the corresponding image split region of the same horizontal position so as to vote to each position in the table; a distance calculating section to calculate a distance from a camera setting position of the pair of cameras to a target object to be detected present in either the forward direction or the rearward direction on the basis of the value of the parallax at any one of the horizontal positions in the table at which a result of voting by the voting section indicates a value higher than a first threshold value; a horizontal range calculating section to derive a horizontal range on the one image over which the target object to be detected is photographed on the basis of the horizontal positions of the respective image split regions corresponding to any positions in the table at each of which the result of voting by the voting section indicates the value higher than the first threshold value; a vertical range calculating section to derive first histograms on horizontal edges for each vertical coordinate value on the whole image within the horizontal range derived by the horizontal range calculating section and to derive a vertical range at each end of which a histogram value of the first histograms indicates a value higher than a second threshold value; an edge selecting section to derive second histograms on vertical edge components for each horizontal coordinate value on the whole image within the vertical range derived by the vertical range calculating section, to search for longitudinal edges present on the one image determined from the second histograms, and to select any one of the longitudinal edges which is located in the vicinity of each end of the horizontal range derived by the horizontal range calculating section from among the searched longitudinal edges; and an actual position calculating section to derive an actual spatial position on each lateral end of the target object present in either the forward or rearward direction with respect to the camera setting position, each lateral end thereof corresponding to the selected longitudinal edge on the one image, on the basis of the distance from the camera setting position to the target object derived by the distance calculating section and the coordinate value of each longitudinal edge selected by the edge selecting section.

BRIEF DESCRIPTION OF THE DRAWINGS

FIGS. 4A, 4B, 4C, and 4D are explanatory views for explaining a dimension of each window and a determination result of parallax for each window corresponding position between two photographed images.

FIGS. 6A, 6B, and 6C are explanatory views representing results of voting shown in FIGS. 5A through 5C carried out to all windows.

FIGS. 8A, 8B, and 8C are explanatory views for explaining a derivation of an absolute value on a horizontal differentiation of a luminance within a range determined in FIGS. 7A through 7C and representing histograms produced by adding the absolute value of the horizontal differentiation value to each x-axis coordinate position.

FIGS. 9A and 9AA are explanatory views representing a result of determination of upper and lower ends of a preceding vehicle photographed (obstacle) which is running ahead of a vehicle on which the distance measuring apparatus according to the present invention is mounted on the basis of a result of derivation shown in FIGS. 8A through 8C (especially the histograms of FIG. 8C).

FIGS. 15A and 15B are explanatory views representing examples of SOBEL's operators used for calculating horizontal and vertical differential images, respectively.

FIGS. 20A, 20B, and 20C are explanatory views for explaining another example of the method of selecting the vertical edges in the case of the specific second example 20 of FIG. 18.

DETAILED DESCRIPTION OF THE PREFERRED EMBODIMENTS

Reference will hereinafter be made to the drawings in order to facilitate a better understanding of the present invention.

First Embodiment

Figure 1:
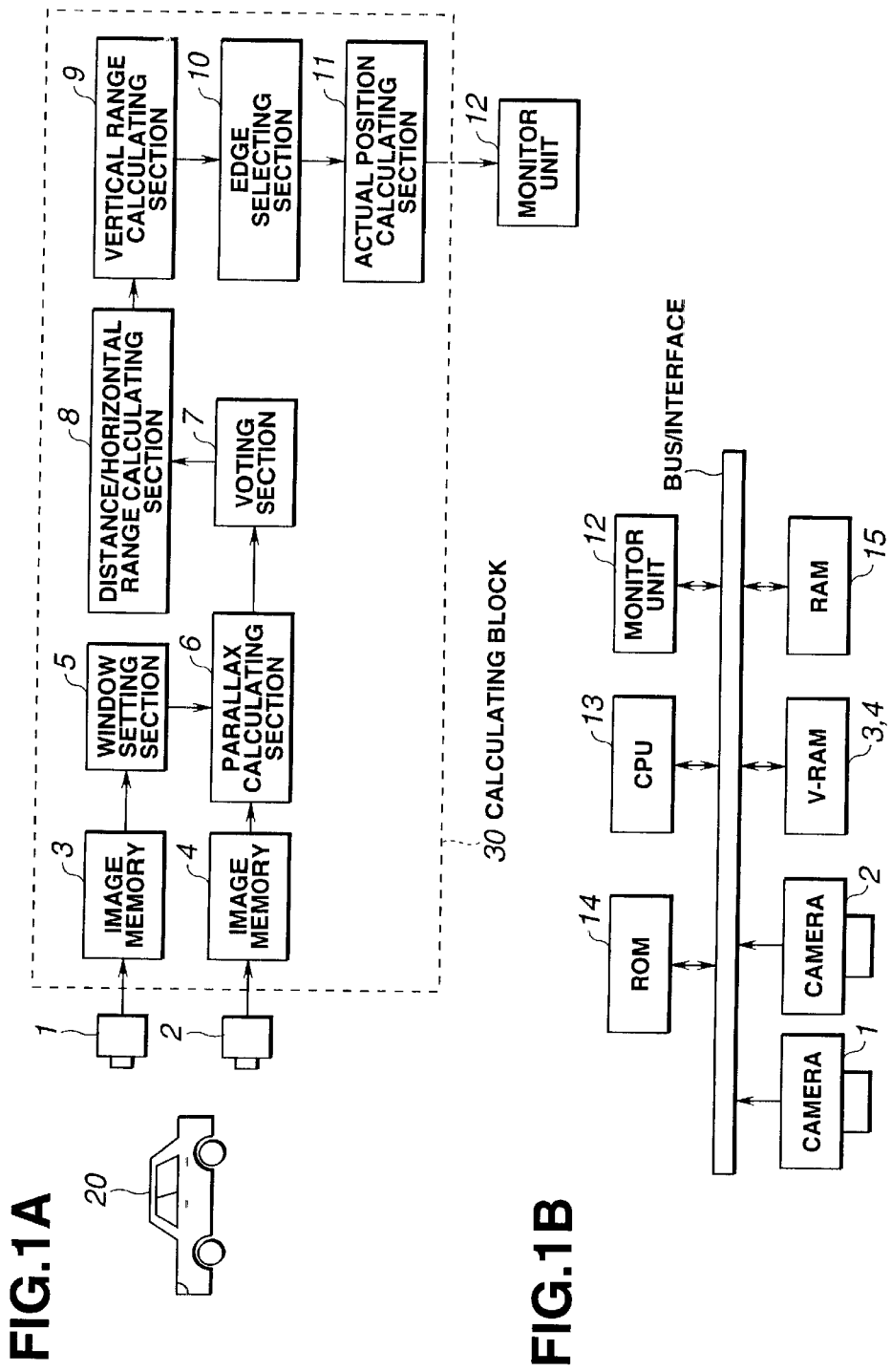
FIG. 1A is a functional block diagram of a distance measuring apparatus in a first preferred embodiment according to the present invention.
FIG. 1B is a circuit block diagram of the distance measuring apparatus in the first preferred embodiment shown in FIG. 1A.

FIGS. 1A and 1B show functional and circuit block diagram of a distance measuring apparatus in a first preferred embodiment according to the present invention.

In FIG. 1A, a pair of electronic cameras 1 and 2 are disposed on a front part of an automotive vehicle so as to direct their viewing portions (viz., lens) toward a forward direction of the vehicle (defined as a forward detection zone). Optical axes of both of the cameras 1 and 2 are mutually parallel to each other and horizontal axes of their photograph planes are aligned on the same line. It is noted that the pair of the cameras 1 and 2 may be disposed on a rear part of the vehicle so as to direct their viewing portions toward a rearward direction to enable a detection of obstacle located behind of the vehicle.

It is also noted that a reference numeral 20 denotes a target object to be detected such as an obstacle present in the forward direction of the vehicle and, in the first embodiment of FIG. 1A, 20 denotes a preceding vehicle which is running ahead of the vehicle at an inter-vehicle distance to the vehicle on the same traffic lane.

Next, the pair of the cameras 1 and 2 are connected to an arithmetic/logic operation unit 30 (also called, a calculating block). FIG. 1B exemplifies an internal circuitry of the calculating block 30. The calculating block 30 includes a microcomputer having a CPU 13(Central Processing Unit), a ROM 13 (Read Only Memory), a RAM 15 (Random Access Memory), a V-RAM 14(Video Random Access Memory), and BUS/INTERFACE.

The V-RAM 14 correspond to a pair of image memories 3 and 4 connected to the corresponding one of the pair of the cameras 1 and 2.

The pair of the image memories 3 and 4 receive image signals from the pair of the cameras 1 and 2.

In FIG. 1A, a window setting section 5 is connected to one of the pair of the image memories 3 and 4. A window corresponds to an image split region as will be described later.

A parallax calculating section 6 is connected to the other of the pair of the image memories 4 and to the window setting section 5. A voting section 7 is connected to the parallax calculating section 6. The voting section 7 is connected to a distance and horizontal range calculating section 8. The distance and horizontal range calculating section 8 is connected to a vertical range calculating section 9. The vertical range calculating section 9 is connected to an edge selecting section 10. The edge selecting section 10 is connected to an actual position calculating section 11. The actual position calculating section 11 is, for example, connected to a monitor unit 12 such as a liquid crystal display. The detailed functions of these selections 3, 4, 5, 6, 7, 8, 9, 10, 11, and 12 in the calculating block 30 will be described later.

Figure 2:
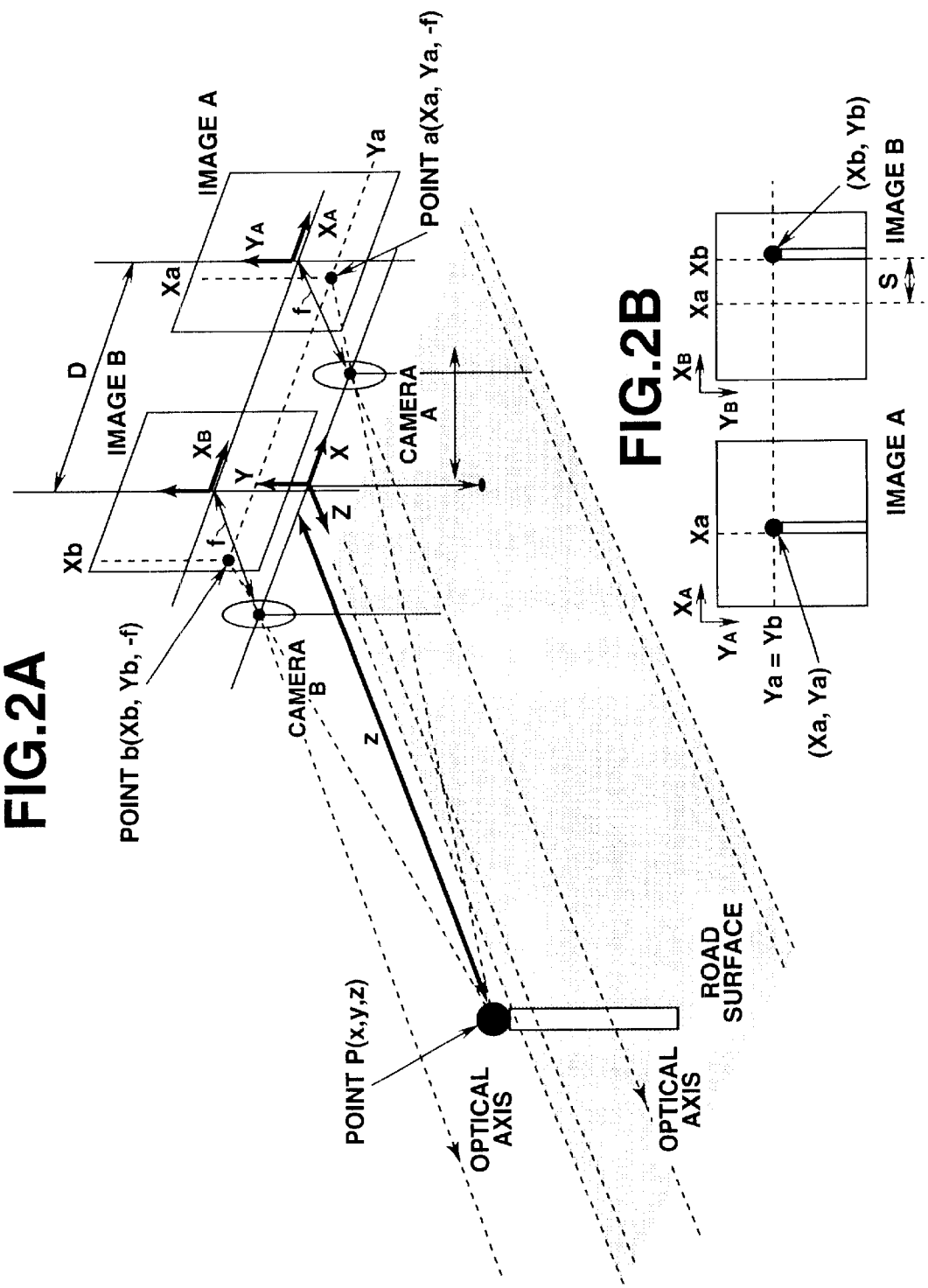
FIGS. 2A and 2B are explanatory views for explaining a theory of operation to derive a distance from a pair of cameras (a camera setting position) to an object to be detected according to a triangulation using two stereophotographic images.

FIGS. 2A and 2B are explanatory views for explaining a basic theory of a determination of a distance from the pair of the cameras 1 and 2 to an object to be detected according to a triangulation using a stereophotographic image processing.

In FIG. 2A, suppose that an image photographed by one of the pair of cameras CAMERA A (corresponds to one of the pair of cameras 1 and 2 as shown in FIGS. 1A and 1B) is denoted by an image A and an image photographed by means of a camera CAMERA B (corresponds to the other of the pair of cameras 1 and 2) is denoted by an image B, and a point p (x, y, z) represents a position of the object to be detected.

As appreciated from FIGS. 2A and 2B, a focal distance f and in an inter-eye distance (a distance between both cameras CAMERA A and CAMERA B) are known values. In the stereophotographic image photographed by means of two cameras CAMERA A and CAMERA B (a line between a center of each camera) to an object point P to be detected can be determined according to an equation (1) expressed below if matching positions Xa and Xb between two sheets of images can be determined.

$$Z = f \times D/(Xa - Xb) = f \times D/S \quad (1).$$

In the equation (1), Xa−Xb=S denotes a parallax. As shown in FIGS. 2A and 2B, when a single object is photographed by means of two cameras CAMERA A and CAMERA B disposed at a predetermined interval of distance with the optical axes being parallel to each other, the parallax is difference in position of the images photographed by the respective cameras, namely, the difference in position between a position Xa at the image A and a position Xb at the image B. It is noted that in the first embodiment a unit of the inter-eye distance D and the distance Z is in m (meters) and a unit of the focal distance f and, the parallax, and the matching positions Xa and Xb is in units of pixels. Each camera CAMERA A and CAMERA B is composed of CCD (Charge Coupled Device, then, each camera 1 and 2 is often called CCD camera). If the number of pixels are 640 (dots=pixels)×480 (dots=pixels), a dimension of one pixel indicates about 10 $\mu$m (10×10$^{-9}$ m).

Figure 3:
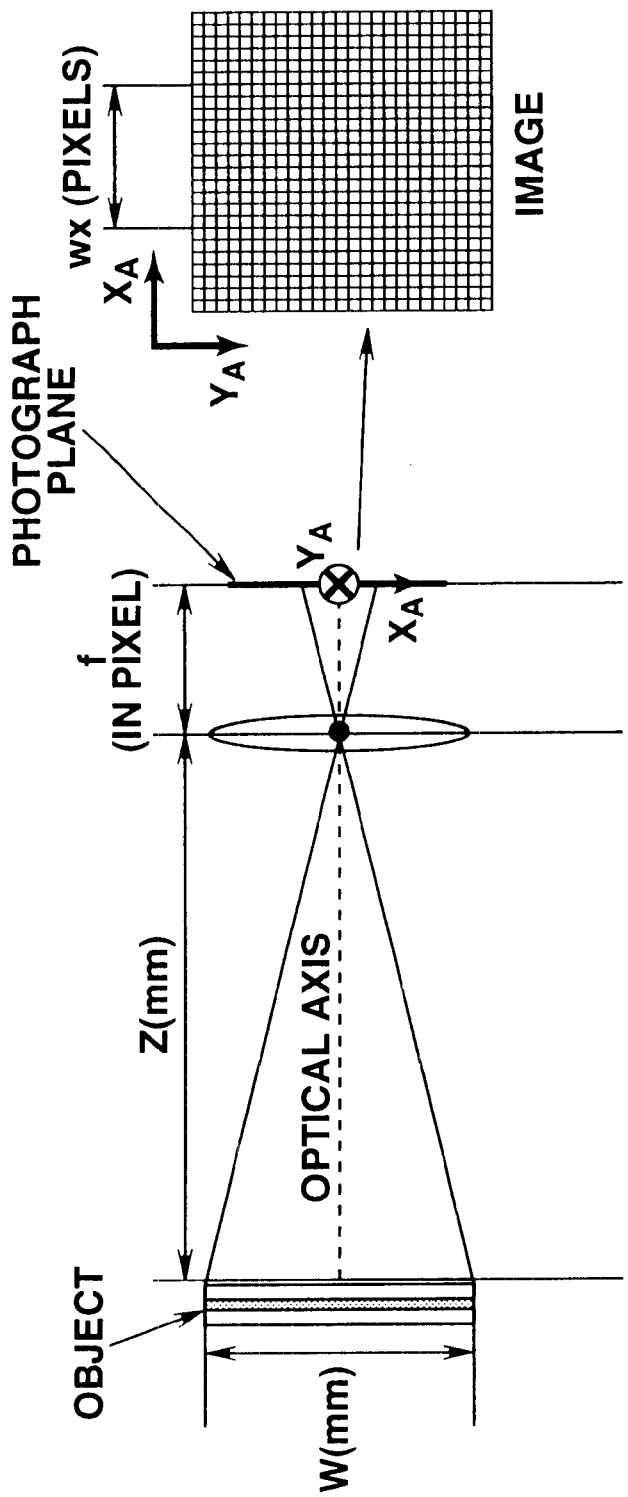
FIG. 3 is an explanatory view for explaining a method of calculating a distance to an object to be detected by means of a stereophotographic image processing.

The focal distance f in the equation (1) is calculated with the unit as the pixel. However, the unit of the focal distance f is usually expressed in mm. In order to convert this unit of mm into a value of pixel, as shown in FIG. 3, the object to be detected is photographed, the object to be detected having a width w (mm) of a known value being placed at a position far away from a distance z (mm). If the number of pixels wx of the object to be detected on the image photographed at this time are detected through an image processing such as an edge detection, the focal distance f in the unit of pixel can be determined as $$f = z w x / W \quad (2),$$

wherein the unit of wx and f are in pixels and that of z and w is in mm.

On the other hand, in order to detect the parallax S, it is necessary to detect a point a (Xa, Ya) on the other image (for example, the image A in FIG. 2A) which corresponds to a point b (Xb, Yb) at which the point p is photographed on one of the images (for example, the image B). This method of detection of the parallax S indicates a method in which a most similar range (a highest similarity) to a certain range of image (window) including the point b (Xb, Yb) on the image B is searched from within the image A. This calculation of the similarity includes a difference calculus method between the images and a normalized correlative coefficient method.

FIGS. 4A, 4B, 4C, and 4D show a result of the determination of the parallax S for each corresponding position on the two photographed images.

Indetails, one of the two images (for example, image B) derived from simultaneous photographs of a road segment scenery in the forward detection zone of the vehicle (on which the pair of cameras 1 and 2 are mounted, as appreciated from FIG. 1A) taken by means of the pair of cameras 1 and 2 is split into a plurality of windows having a predetermined (two-dimensional) dimension. Then, any one of the positions on the other (for example, image A) of the two images described above which provides the highest similarity to the corresponding window of the one image (image B) is determined so that the mutually corresponding positions between the two images (image A and image B) are detected. This determination of the mutually corresponding positions is carried out for all of the windows. FIGS. 4A through 4D show the process of these determinations of the mutually corresponding positions between the two images and the result of the determinations (calculations) of the parallax S for each window from their corresponding positions between the two images.

FIG. 4A shows a left-sided image (corresponds to the image A in FIG. 2A).

FIG. 4B shows a right-sided image (corresponds to the image B in FIG. 2A).

FIG. 4C shows a table of the parallax S.

FIG. 4D shows an image produced by extracting only parts of the windows on each of which the parallax value of 15 is indicated.

In FIGS. 4B and 4C, ① through ⑳ denote the respective positions of the windows in the horizontal direction (hereinafter, referred to as a lateral direction). It is noted that a single window has a width xw (a length in the x-axis direction) and a height yw (a length in the y-axis direction) as shown in FIG. 4A.

As described above, if the parallax S is determined for each window, the distance Z to the object photographed on each corresponding window can be determined using the above equation (1).

It is noted that an image as the result of the determinations of the parallax S and of the distance Z to the object photographed in the internal range of each window as shown in FIGS. 4A, 4B, 4C, and 4D is hereinafter called a "range image".

The parallax S calculated for each window corresponds to a distance to any object photographed in the internal range of each window and having a feature such as an edge. Hence, if a single object to be detected is photographed over any plural windows, the same parallax value S between the mutually adjacent windows can be determined. It is noted that in a continuous image, a sharp intensity transition between neighboring pixels, for example, a sharp change in intensity, would be considered the edge and the edge corresponds to a line segment indicating an end of the continuous image.

For example, in the case of the range image in the image derived from the photograph of the road segment scenery in the forward direction of the vehicle, both of the preceding vehicle and a part of a road surface on which the preceding vehicle is present give the same distance. Hence, as denoted by bold solid line windows in FIG. 4D, any continuous windows present in the same y-axis coordinate as a lower (bottom) part (just above the part of the road surface described above) of the preceding vehicle are calculated to have the same parallax value as the preceding vehicle.

For example, the laterally continuous windows in a second lowest row in FIG. 4D on each of which the same parallax value of 15 is indicated correspond to the lower part of the preceding vehicle and the part of the road surface described above.

It is noted that, in FIG. 4C, a concentrated center part of the windows on each of which the same parallax value of 15 is continuously indicated corresponds to the image on the preceding vehicle, a concentrated part of the windows vertically aligned in columns of ③ and ④ on each of which the same parallax value of 19 is continuously indicated corresponds to a left-sided tree at the side of the road surface (refer to FIGS. 4A and 4B), and a concentrated part of the windows vertically aligned in a column ⑥ on each of which the same parallax value of 19 is continuously indicated corresponds to a center upper tree at the side of the road surface (refer to FIGS. 4A and 4B).

As described above, if an object having a certain height is present in the forward detection zone as described with reference to FIGS. 4A through 4D, in the case of the range image, the same parallax value can be detected at the continuous windows in the x-axis direction on which the object is photographed.

On the other hand, at any position of the windows on which any object having no height such as a white line on the road located at the lateral side of the preceding vehicle (refer to FIGS. 4A and 4B) is photographed, it is the single window on which the same parallax value is indicated from among the continuous windows aligned along the same x-axis coordinate position.

According to the above-described method, the single object or even a plurality of objects can be detected using the same method. Consequently, the object(s) can be recognized (detected) irrespective of a shape of the object to be detected and a color of a background.

In addition, since, in the case of a road surface display (indication) such as the white line normally present aside the road surface and a stop line crossing the road surface, the continuous windows on each of which the same parallax value is indicated does not appear in the same direction. Hence, an erroneous detection of the obstacle (the preceding vehicle) having the certain height from the road surface display cannot be made. Furthermore, since the range image only is utilized, the plurality of objects can be detected using the same processing irrespective of the color and shape of the object(s) to be detected and the background color.

The above-described structure and explanation till the parallax calculating section 6 are also described in a Japanese Patent Application No. Heisei 10-154625 filed in Japan on Jun. 6, 1998. The present invention is, however, an evolution of the disclosed invention in the above-identified Japanese Patent Application. Namely, the present invention is concerned with a technique to more accurately detect the lateral end positions of the obstacle (e.g., the preceding vehicle) present in the forward detection zone or rearward detection zone.

Figures 5A, 5B, 5C:
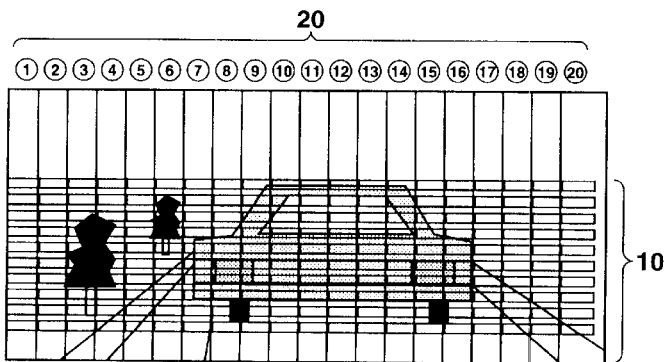
FIGS. 5A, 5B, and 5C are explanatory views representing an operation of voting at respective lateral positions of windows in a table of parallax x lateral position on the basis of the parallax derived from a certain window on a range image and its lateral position of the certain window.

FIGS. 5A, 5B, and 5C show an operation of a voting at each corresponding position (carried out by the voting section 7) in a table (refer to FIG. 5C) on the basis of the parallax determined on a certain window on the range image and its lateral position of the certain window. FIG. 5A shows the right-sided image which corresponds to FIG. 4B. FIG. 5B shows the table of the parallax which corresponds to FIG. 4C. FIG. 5C shows the voting table. It is noted that the term of voting means, in this embodiment, that a plus one (+1) is incrementally (accumulatively) added to any lateral position on each of the windows of which the same parallax value is indicated.

In details, for example, if the value of the parallax of 15 is indicated at a single certain position of the windows belonging to one (column ⑧) of the x-axis coordinate positions, plus one is added to the position belonging to the column ⑧ shown in FIG. 5C on which the parallax value of 15 is indicated. In the example shown in FIG. 5B, since the y-axis positions belonging to the column ⑧ on each of which the same parallax value of 15 is indicated are five, a total of five are finally voted at the position in the column ⑧ shown in FIG. 5C on which the parallax value of 15 is indicated.

FIGS. 6A, 6B, and 6C show the result of voting carried out for all windows. FIG. 6A shows the right-sided image (corresponding to FIG. 5A). FIG. 6B shows the table of the parallax. FIG. 6C shows the table of voting.

As appreciated from FIGS. 5A, 5B, and 5C, the windows, set as shown in FIGS. 4A through 4D located at the same lateral position of the columns ① through ⑳ are derived from the photograph taken in the same direction. In addition, as appreciated from FIGS. 6A through 6C, if any object is present in the forward detection zone, on any longitudinally continuous windows on the same x-axis coordinate (the same column of ①  through ㉑ ) on which the object is detected, the same parallax value is determined. If no object is present on the road surface photographed, the same parallax value is indicated on any laterally continuous windows located at the same y-axis coordinate values each of which the same parallax value is indicated.

Using such a range image as described above, the voting is advanced to form the table shown in FIG. 6C according to the method of voting as shown in FIGS. 5A through 5C. At this time, if the same parallax value is aligned in the same direction (on the same x-axis direction of any one of the columns ① through ⑳ , the number of times the voting to the corresponding direction and to the parallax value has been carried out are increased.

As the voted value at the corresponding position becomes increased, the total value at that position becomes accordingly increased.

Therefore, if the CPU 13 searches for the position in the x-axis direction from the table as shown in FIG. 6C at which the table shown in FIG. 6C at which the total values as the result of voting indicates higher value than a predetermined threshold, the CPU 13 can detect the presence of the object in the forward detection zone.

In the example shown in FIGS. 6A and 6B, the voting is concentrated and the total values are increased at any longitudinally continuous windows belonging to the x-axis coordinates of column ③ and ④ and on each of which the same parallax value of 19 is indicated (corresponds to the left-sided tree as shown in FIG. 6A), at any longitudinally continuous windows belonging to the x-axis coordinate of column ⑥ and on each of which the same parallax value of 5 is indicated (corresponds to the center tree as shown in FIG. 6A), and at any longitudinally continuous windows belonging to the x-axis coordinates of columns ⑧ through ⑯ and each of which the same parallax value of 15 is indicated (corresponds to the preceding vehicle as the target object in FIG. 6A).

For example, parts of the windows at which the total voted values are equal to or higher than the predetermined threshold indicates that such a certain object that the parallax S indicates approximately 15 pixels is photographed within an imaging angle over which the pair of cameras 1 and 2 has photographed.

Suppose that the inter-eye distance D shown in FIG. 2A is 0.1 m and the focal distance f is 1500 pixels. The distance Z from the camera position of the pair of cameras 1 and 2 to that object (the preceding vehicle) is determined to be 10 m (=1500×0.1/15) ahead according to the above equation (1).

In addition, when the result of voting at the windows on each of which the same parallax value of 15 pixels is indicated is observed in the x-axis direction, as viewed from FIG. 6C, high numerical values are indicated at the laterally continuous windows belonging to the columns of ⑧ through ⑯ and low numerical values are indicated at the remaining laterally continuous windows located at left and right ends of the laterally continuous windows belonging to the continuous columns of ⑧ through ⑯ .

It is noted that any windows in FIG. 6C on which small values of the total voting result such as 1 or 2 indicate noise or the white line.

Figure 7A:
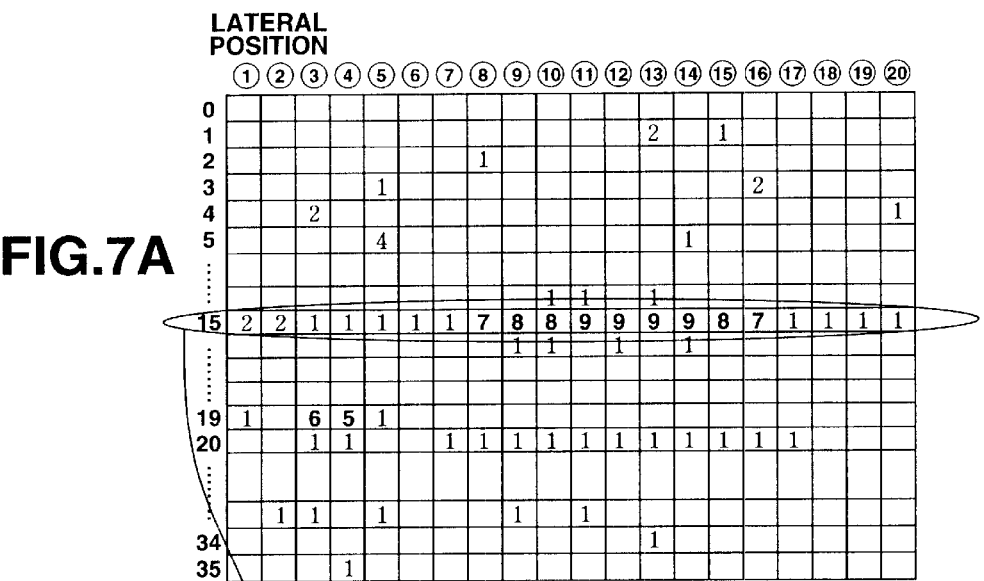
FIGS. 7A, 7B, and 7C are explanatory views representing a one-dimensional graph, parts of the windows whose parallax value corresponds to 15 pixels being extracted from the result of voting for all windows shown in FIGS. 6A through 6C.
Figure 7B:
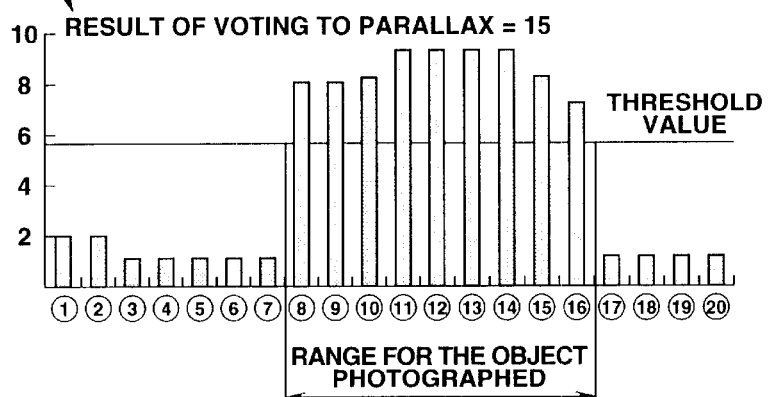
Figure 7C:
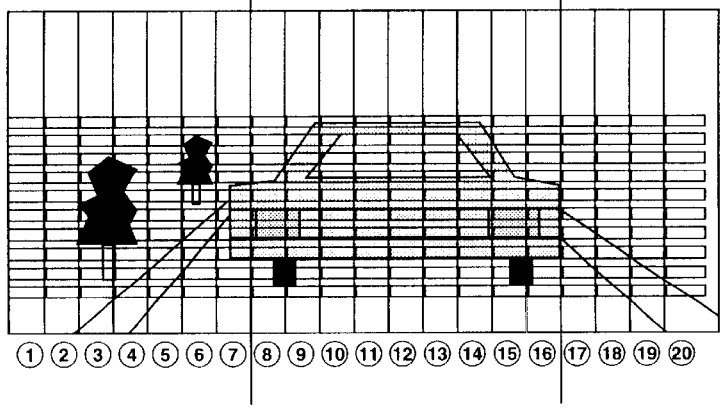

FIGS. 7A, 7B, and 7C show respectively one-dimensional (1-D) graphs, with the parts of the image (image B), i.e., any windows on each of which the same parallax value of 15 is indicated being extracted from the result of voting shown in FIG. 6C in order to help understanding the description with reference to FIGS. 6A through 6C.

FIG. 7A corresponds to the table shown in FIG. 6C. FIG. 7B shows the one-dimensional graph. FIG. 7C shows the image corresponding to FIG. 7B.

A method of determining an approximate lateral (x-axis direction) range in which the object to be detected is photographed will be described below with reference to FIGS. 7A through 7C.

In FIG. 7B, the lateral axis thereof indicates positions of the respective windows defined in the x-axis direction (columns of ① through ⑳ and the longitudinal axis thereof indicates the number of the windows on each of which the same parallax value of 15 is indicated at each column (x-axis position) of ① through ⑳ . In FIG. 7B, the numerical values at the columns continued from ⑧ through ⑯ are remarkably higher than the predetermined threshold. This means that the object having the certain height is photographed at the columns of ⑧ through ⑯ . In addition, a laterally oriented straight line denotes the predetermined threshold. The predetermined threshold is provided in order to determine whether the target object has been photographed. The predetermined threshold may be set as follows: That is to say, the numerical values in the longitudinal axis are proportional to the height of the imaged object photographed on the image and the height thereof is inversely proportional to the distance D to the actual object if the height of the actual object is constant.

According to this fact, the height of the imaged object on the image is calculated according to the distance D to the actual object and the predetermined threshold of a histogram shown in FIG. 7B can be set with the number of the windows included in the calculated height as a reference. For example, in FIG. 7B, the predetermined threshold is set to 5.5. Hence, since the x-axis positions having the values equal to or higher than the predetermined threshold of 5.5 are the windows belonging to the columns of ⑧ through ⑯ , the approximate horizontal range in which the target object present in the forward detection zone is photographed is between the laterally continuous windows belonging to the columns of ⑧ through ⑯ .

Next, FIGS. 8A, 8B, and 8C show an original image (image B), an image representing a result of a calculation of a horizontal differentiation, and a histogram representing a result of a derivation of an absolute value of the horizontal differentiation on a luminance (or intensity) with the approximate horizontal range determined in the case of FIGS. 7A through 7C and a result of an addition of the absolute value of the horizontal differentiation for each x-axis coordinate, respectively.

It is noted that xs and xe denote x-axis coordinate positions of approximate ends of the photographed vehicle.

In the case where the detected object in the forward detection zone is the preceding vehicle, the histogram values at the positions of the preceding vehicle having horizontal edges such as upper and lower ends, a bumper, and rear windshield frame of a vehicle body of the preceding vehicle become abruptly increased, as appreciated from FIGS. 8A through 8C.

It is noted that the reason of the addition of the absolute value of the horizontal differentiation to each x-axis coordinate position is to prevent the color of the vehicle as the preceding vehicle from entering the histogram values and to prevent the histogram value on each edge from being lowered due to a mutual canceling of the respective edges which are slightly oblique and thin in spite of the fact that the edges are present.

In addition, since, in this embodiment, a range to produce the histogram on the horizontal differential value is restricted within the approximate horizontal range in which the target object has been detected, there are less possibility that the edge components except the preceding vehicle are added to the absolute value of the horizontal differentiation. In other words, since the positions at which the histogram values are relatively high are deemed to be the edges of the vehicle, one of the edges present at a rather upper part of the image and any one of the other edges present at a rather lower part of the image can be deemed to be the edges of the upper and lower ends of the preceding vehicle.

FIGS. 9A and 9AA show the image and a histogram representing the result of determination of the upper and lower ends of the preceding vehicle.

Each small-sized star mark located at a leftmost portion of FIG. 9AA denotes a location at which a corresponding horizontal edge is detected. Each large-sized star mark located at a rightmost position of FIG. 9AA denotes y-axis coordinate position of the upper and lower ends of the preceding vehicle shown in FIG. 9A.

It is noted that a range B shown in FIG. 9A denotes a vertical range from the upper end of the preceding vehicle and to the lower end of the preceding vehicle.

Figure 10A:
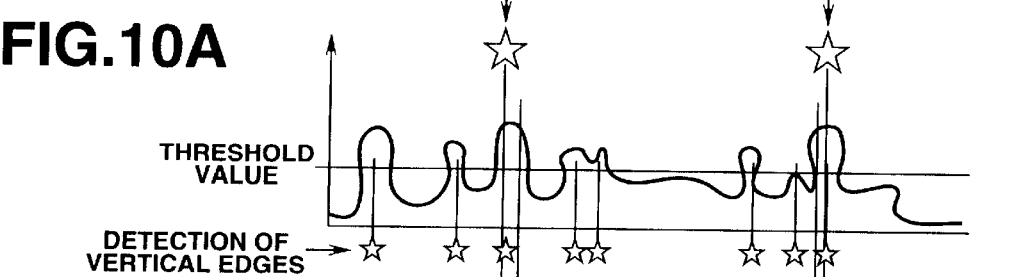
FIGS. 10A, 10B, and 10C are explanatory views representing a calculation of a vertical differentiation of an image within a range B whose limits correspond to the respective upper and lower ends of the preceding vehicle derived by the method shown in FIGS. 9A and 9AA and a result of producing other histograms of vertical differential components within the range B for each x-axis coordinate position.
Figure 10B:
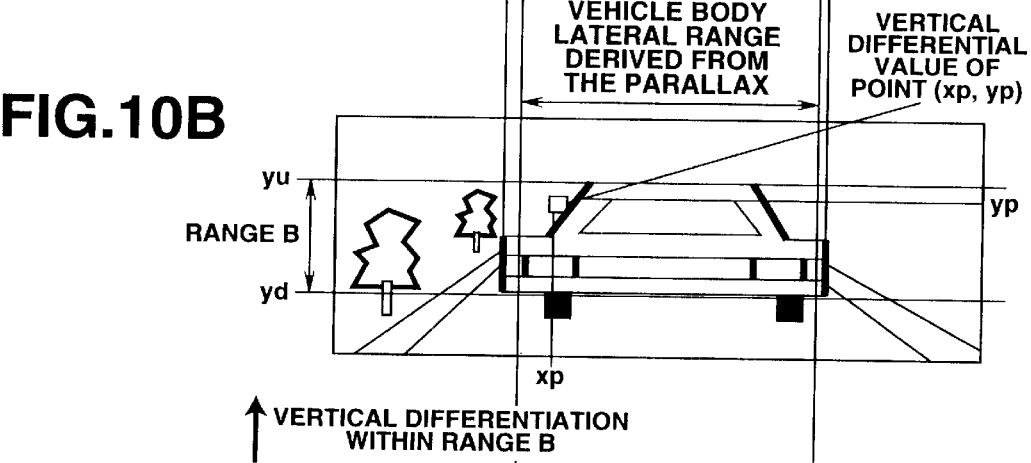
Figure 10C:
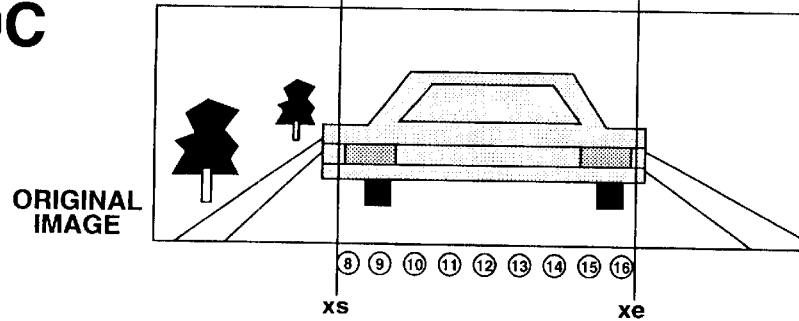

FIGS. 10A, 10B, and 10C show the histogram produced through a vertical differentiation of the image within the range B defined between the upper and lower ends of the preceding vehicle as shown in FIGS. 9A and 9AA and the histogram taken for each x-axis coordinate position of the vertical differentiation components within the range B.

FIG. 10A shows the histogram on the vertical differentiation. FIG. 10B shows an image on the vertical differentiation. FIG. 10C shows the original image (image B).

In the same manner as the case where the range B is determined, FIG. 10A indicates the histogram on the vertical differentiation components of only the part of the image in which the preceding vehicle is photographed.

Hence, the histogram values at the parts of the vehicle shape at which the edges are present becomes high. In addition, in the processing step, the approximate horizontal end portions (between ⑧ and ⑯) on the image at which both ends of the preceding vehicle are photographed are already determined at the image processing step in FIGS. 10A through 10C. Therefore, the x-axis coordinate positions located in the vicinity of the left and right ends of the preceding vehicle and including a great number of vertical edge components can be determined on the left and right ends of the preceding vehicle.

Two positions denoted by respective large-sized star marks in FIG. 10A correspond to the left and right ends of the photographed preceding vehicle. In the example shown in FIGS. 10A through 10C, the left and right ends are positioned slightly outside the approximate horizontal end x-axis coordinate positions xe and xs derived at the processing step described with reference to FIGS. 7A through 7C.

In the processing step described with reference to FIGS. 10A through 10C, the range to produce the edge histogram is the range not including any other images than the preceding vehicle. Hence, the produced histogram values are not influenced by a change in the background.

In addition, since the lateral edges can be determined in the units of pixels, the positions of the lateral edges can be determined with a higher accuracy than the lateral position searching method from the range image.

Figure 11:
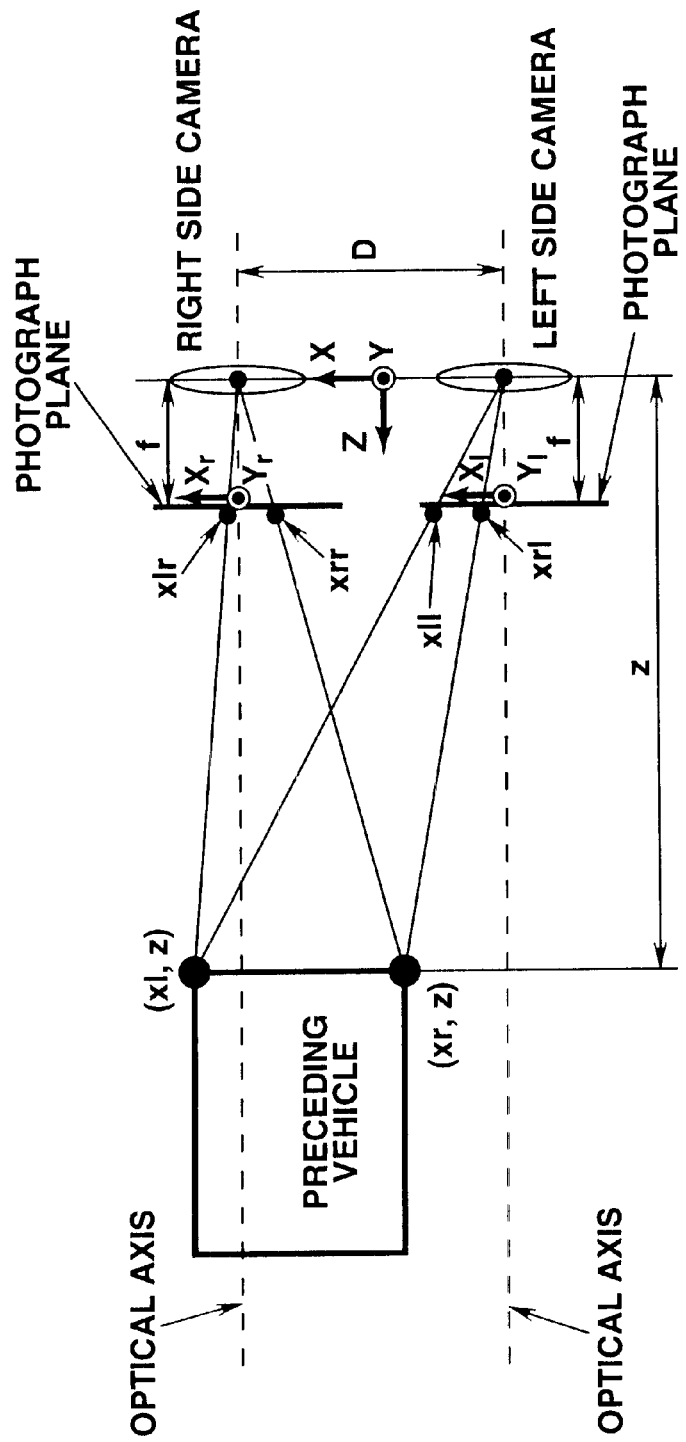
FIG. 11 is an explanatory top view of the camera setting position shown in FIG. 2A.

FIG. 11 shows the setting position of the pair of the cameras 1 and 2 shown in FIGS. 2A and 2B viewed from an upper sky.

A method of determining actual lateral end positions of the obstacle (in this case, the preceding vehicle) with respect to a camera setting position on the basis of the lateral end positions of and the distance D to the obstacle (the preceding vehicle) derived on the image will be described below with reference to FIG. 11.

Suppose that an origin of the x-y coordinate system is placed on a middle point of a line segment connecting between each lens center of the pair of left and right cameras 1 and 2 (right side camera and left side camera) shown in FIG. 11.

Suppose that the x-axis coordinate values of the left and right ends of the preceding vehicle determined in the right side image (called, the original image) are xlr and xrr (unit is pixel), the focal distance is f (unit is pixel), the distance to the preceding vehicle determined from the parallax value is z (unit is meter (m)), and the inter-eye distance (the distance between the pair of cameras) is D (unit is meter). The distances xl and xr (unit is meter (m)) to the left and right ends of the preceding vehicle can be determined by the following equation (3).

$$xl = xlr \cdot z/f + D/2, \quad xr = xrr \cdot z/f + D/2 \qquad (3).$$

It is noted that the window setting section 5 and the parallax calculating section 6 correspond to the description with reference to FIGS. 4A through 4D, the voting section 7 corresponds to the description with reference to FIGS. 5A through 5C and 6A through 6C, the distance/horizontal range calculating section 8 correspond to the description with reference to FIGS. 6A through 6C, FIGS. 7A through 7C, and 8A through 8C, the vertical range calculating section 9 corresponds to the description with reference to FIGS. 9A and 9AA, the edge selecting section 10 corresponds to the description with reference to FIGS. 10A through 10C, and the actual position calculating section 11 corresponds to the description with reference to FIG. 11.

As described above, in the first embodiment, utilizing the fact that the windows on each of which the same parallax value is indicated are tended to the concentrated in the same direction when any object is present in the forward detection zone, the voting value (plus one) is added to each corresponding position in the table having the parallax value aligned in the lateral directions (columns) in the other axis on the basis of the lateral position of the corresponding one of the windows on which the parallax value determined for each window is indicated. This operation is carried out for all windows. Any position whose value is relatively high is searched from the table produced as the result of the addition of the voting value to all positions of windows to determine the distance and the approximate horizontal range within which the preceding vehicle is photographed. In order to prevent the influence of the background from being received, within the approximate horizontal range, the horizontal edges are detected according to the histogram on the horizontal edges to determine the range B defined between the upper and lower ends of the preceding vehicle. The vertical edges are, then, determined according to the other histogram on the vertical edges within the range B. Then, the edges placed in the vicinity of the approximate lateral range limits derived from the table of parallax x lateral position are selected from the vertical edges to determine the lateral ends of the preceding vehicle on the image. Then, the actual lateral positions of both ends of the preceding vehicle are determined on the basis of the lateral end positions of the preceding vehicle on the image and the distance z to the preceding vehicle determined from the parallax value.

Hence, the lateral end positions of the photographed vehicle which are usually short as compared with the horizontal edge and which would be difficult to be detected due to the influence of surrounding trees or walls can be detected with the high accuracy. Consequently, a robust detection of the lateral end positions of the object (obstacle) not susceptible to the surrounding environment becomes possible.

In the first embodiment, if a plurality of preceding vehicles are detected according to the table of parallax x lateral position (refer to, e.g., FIG. 6C), the same processing as described above is repeated for each preceding vehicle in the same manner so that the lateral end positions of the respective preceding vehicles can be determined.

Second Embodiment

Next, the distance measuring apparatus in a second preferred embodiment will be described below.

In the image processing described in the first embodiment, the approximate vehicular lateral positions are determined at the unit of each window as in the process shown in FIGS. 7A through 7C. However, if the preceding vehicle (target object) to be detected is present in a close distance to the camera setting position, a part of the image located at the left and right ends give regions in which no corresponding points are found out due to one of the problems in the stereophotographic image processing, i.e., an occlusion (a range in which a forward positioned image is hidden by an image positioned nearer to the camera setting position than the forward positioned image is different between the left side image and the right side image), as shown in FIG. 12.

Hence, the result of determination on the approximate lateral (left and right) ends is often dependent upon the background. Consequently, the parallax values determined at the lateral ends of the preceding vehicle indicate, in many cases, erroneous measurements.

Figure 12:
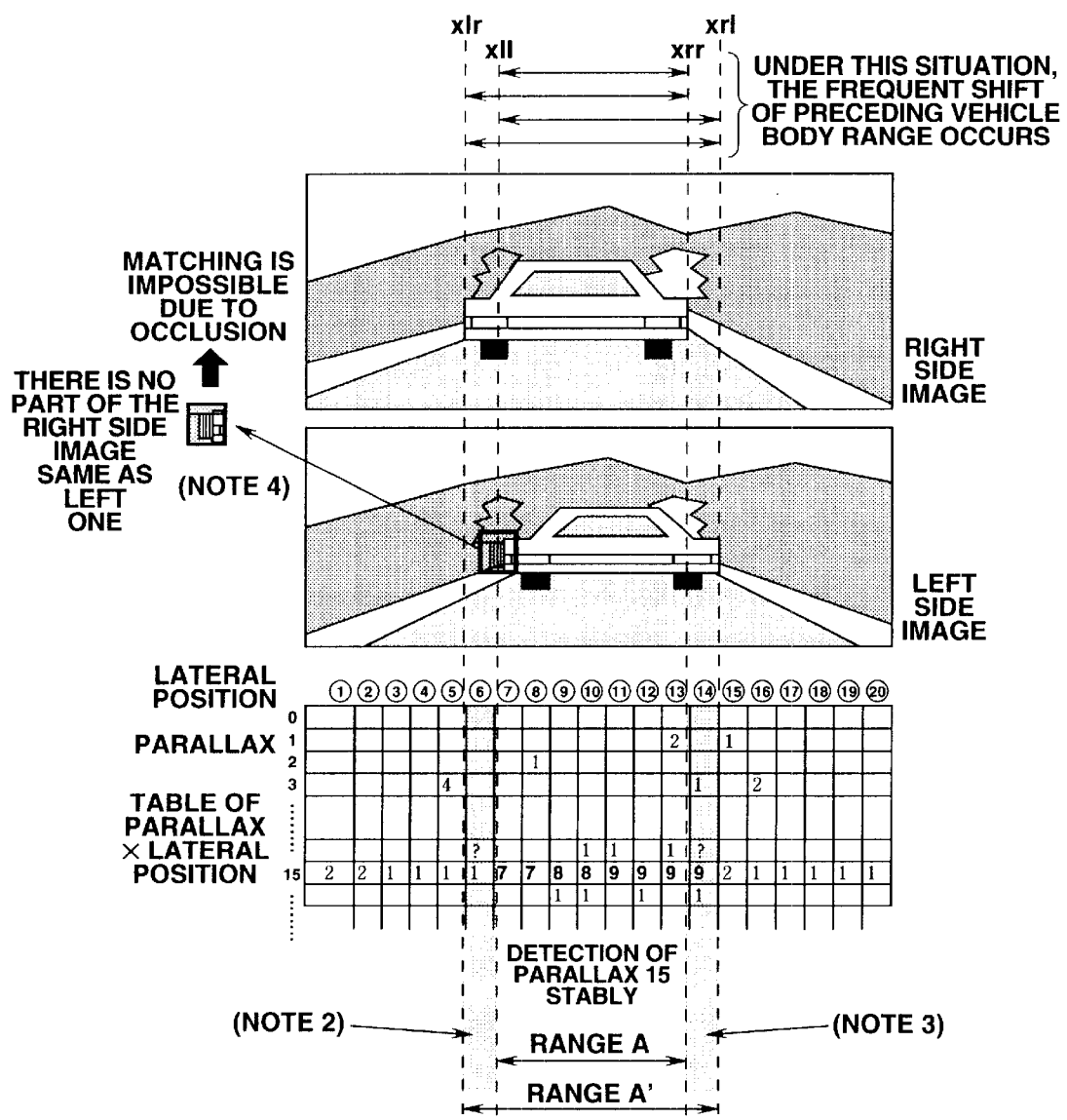
FIG. 12 is a series of explanatory views for explaining a result of an unstable image processing due to an occlusion.

It is noted that regions of windows on which the parallax values tend to become unstable are two regions, one being defined between the position xlr at which the left end of the vehicle is photographed in the right side image in FIG. 12 and the position xll at which the left end of the vehicle is photographed in the left side image in FIG. 12 and the other being defined between the position xrr at which the right end of the preceding vehicle is photographed in the right side image in FIG. 12 and the position xrl at which the right end of the vehicle is photographed in the left side image in FIG. 12.

Therefore, the range between xll and xrr except the ranges between xlr and xll and between xrr and xrl is defined as a range A in which the vehicle, i.e., the preceding vehicle is positively present without failure. The range A is the range within which the histogram on the horizontal edges is produced.

On the other hand, the other range defined between xlr and xrl including the unstable parallax value indicating regions of between xlr and xll and between xrr and xrl is a range A' which is a candidate of the presence of the preceding vehicle. This range of A' is used, in the case of the first embodiment, as a reference to the edge selection range when finally determining the lateral (left and right) end edges in the image.

To determine the range A, when such a process as to determine the approximate x-axis directional range in which the image of, e.g., the preceding vehicle is present is carried out continuously in time, a part of the whole image which is determined to be within the range continuously is defined as the range A.

To determine the range A', a part of the whole image which is determined to be within the range not continuously but by a predetermined number of times or more is the range A'.

In the second embodiment described above, when determining the approximate lateral positions of the preceding vehicle from the table produced in the first embodiment, the distance measuring apparatus determines the range A within which the preceding vehicle is determined to be present continuously in time and the range A' within which the preceding vehicle is determined to be present not continuously but by the predetermined number of times or more and determines the horizontal edges within the range A when determining the horizontal edges of the preceding vehicle. The horizontal edges thereof can be detected more accurately without reception of the influence of the background.

Furthermore, if the preceding vehicle is located at the close distance to the camera setting position, the occlusion causes the parallax values of the windows located in the vicinity of the lateral ends of the vehicle in the table of parallax x lateral position to become unstable. Hence, there is a possibility that the selection of the vehicular end edges detected within the range B (refer to FIG. 9A) may be erroneous not only the detection range of the horizontal edges. In the second embodiment, since both of the range A which is positively in the vehicle and the range A' which is the candidate of the vehicle range are determined, the selection of the vehicular end edges can become more accurate with these two ranges A and A' taken into consideration.

Third Embodiment

Next, the distance measuring apparatus in a third preferred embodiment according to the present invention will be described below.

In the third embodiment, the horizontal straight lines are detected using a Hough conversion (transformation) or any other generally known method of a straight line detection within the range A within which the object (preceding vehicle) is positively present without failure as described in the second embodiment described above when the upper and lower ends of the preceding vehicle on the image are determined.

When determining the horizontal edges of the vehicle, as described above, the horizontal edges only within the range A are detected whose limits correspond accurately to the ends of the preceding vehicle photographed.

Hence, since the influence of some edges present in the background is decreased, it is possible to use a single edge detection method. Consequently, a higher speed detection of the horizontal edges can be achieved.

In the case where the object to be detected is known, the edge detection method according to the object to be detected within the range A can be carried out so as to be enabled to be applied to the assured and high-speed processing.

In addition, since a reliability of the horizontal detection data can be improved due to the restriction of the range on the range A, various types of the straight line detection methods can be applied to the edge detection.

It is noted that the Hough transformation (conversion) is exemplified by a U.S. Pat. No. 5,892,855 (issued on Apr. 6, 1999), the disclosure of which is herein incorporated by reference.

Fourth Embodiment

Next, the distance measuring apparatus in a fourth embodiment according to the present invention will be described with reference to FIGS. 13A and 13B.

In the fourth embodiment, when determining the upper and lower ends of the vehicle (preceding vehicle) on the image (the range B in the vertical direction as shown in FIG. 9A), at first, the respective upper and lower positions at which the upper and lower ends of the preceding vehicle could be photographed are restricted and any edge detected in a vicinity of each of these positions is selected.

This restriction of these positions can be carried out in the following calculation.

Figure 13A:
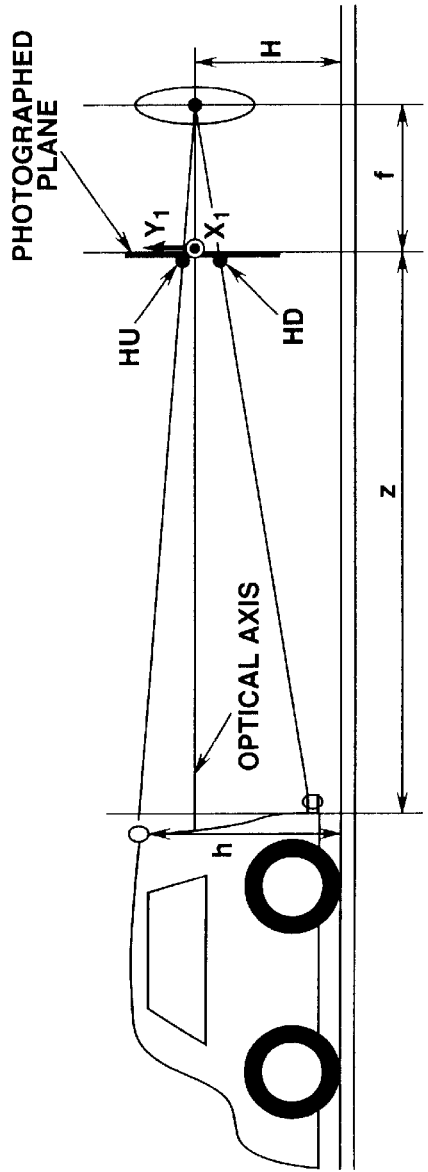
FIGS. 13A and 13B are explanatory views for explaining a method of deriving an approximate photographed position of the preceding vehicle on the image.
Figure 13B:
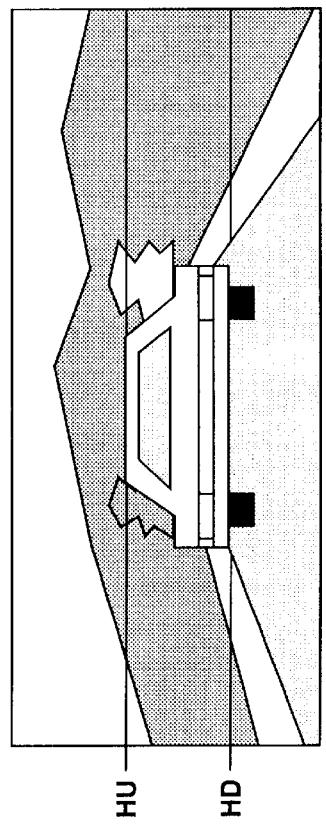

Since the distance to the vehicle has been determined on the basis of the range image, approximate longitudinal positions (y-axis positions) in which the vehicle (the preceding vehicle) is photographed on the image can be determined, as shown in FIGS. 13A and 13B.

Suppose, in FIGS. 13A and 13B, that the distance from an imaged surface to the detected preceding vehicle is z, a vehicular height (a roughly determined height which could be estimated from a generally available vehicle and is a preset value) is h, a height from the ground (road surface) to each of the pair of cameras 1 and 2 is H.

An approximate vertical range from HU to HD on the image surface can be determined in the following equation (4).

$$HU = f \times (h-H)/z, \quad HD = -f \times H/z \qquad (4).$$

As the y-axis coordinate positions of the upper and lower ends of the vehicle (preceding vehicle), from among those horizontal edges detected through the histogram on the horizontal edge produced within the range A or detected through such a Hough conversion (transformation) as described above within the range A which are located in proximities to the position of Y1 (corresponds to HU) and to the position of Y2 (corresponds to HD).

As described above, in the fourth embodiment, when the upper and lower ends of the vehicle are selected from the edges determined within the range A, the approximate vertical positions HU and HD at which the upper and lower ends of the preceding vehicle are photographed are determined and the edges detected in the vicinity of the approximate vertical positions HU and HD are selected. Hence, the erroneous detection of the horizontal edges except those of the preceding vehicle such as a shadow on the road surface or a footbridge which is sometimes photographed within the range A from those required horizontal edges of the preceding vehicle can be prevented.

Furthermore, since the detection range of the required horizontal edges is restricted only onto the previously determined positions at which the upper and lower ends of the preceding vehicle would be photographed, a further high-speed image processing can be achieved.

Fifth Embodiment

A fifth preferred embodiment of the distance measuring apparatus will be described below.

It is noted that the structure of the fifth embodiment is the same as that in the first embodiment shown in FIGS. 1A and 1B.

When determining the left and right ends of the vehicle on the image, the distance measuring apparatus in the fifth embodiment determines an average value of a luminance within the above-described vertical range B for each x-axis coordinate position of the windows continuously in time utilizing the fact that the background surrounding the preceding vehicle is varied with time although the luminance in the inner side of the vehicle is not varied with time.

Then, the distance measuring apparatus stores the average value for every number of times determined for each x-axis coordinate position of the windows and calculates a variance of the average value in the luminance for each x-axis coordinate position within the predetermined period of time. Then, the distance measuring apparatus determines that a range in which the variance described above indicates a relatively small value is determined to be an inner part of the vehicle, i.e., a vehicle body so that the lateral (left and right) ends of the vehicle can be determined.

As described above, when determining the lateral end positions of the vehicle (preceding vehicle) within the range B, the distance measuring apparatus calculates the average value of the luminance for each x-axis coordinate position within the vertical range B continuously in time and determines that the x-axis coordinate positions at each of which the time variance of the average value in luminance calculated for each x-axis coordinate is relatively small value are lateral range limits within which the vehicle is photographed. Hence, the detection of each of the left and right ends of the vehicle becomes possible even under the situation wherein it is difficult to detect the longitudinal edges due to the fact that the background indicates the same color as the vehicle or so on.

Sixth Embodiment

Next, the distance measuring apparatus in a sixth preferred embodiment according to the present invention will be described below.

It is noted that the structure in the sixth embodiment is the same as that in the first embodiment shown in FIGS. 1A and 1B.

When determining the left and right ends of the vehicle on the image, the distance measuring apparatus in the sixth embodiment determines the positions of the vertical edges, the vertical edges being located within the x-axis directional ranges corresponding to the inner part of the vehicle, i.e., the vehicle body derived in the processing step in the fifth embodiment and located in the vicinity of the assured range A and the candidate range A' determined in the second embodiment and being determined from the histogram of the vertical edge or from the Hough transformation. From among the determined vertical edges, the distance measuring apparatus selects any edges present in the vicinity of both ends of a range in which the variance in luminance average value calculated continuously in time indicates the respectively small value.

As described above, from among the determined edges, any edges located in the vicinity of both ends of the range in which the variance of the average value in the luminance for each x-axis coordinate position indicates the relatively small value and located in the vicinity of the interval range between the ranges A and A' determined according to the parallax values are selected as the lateral ends of the vehicle (the preceding vehicle).

Hence, no erroneous determination that the determined lateral ends are located at any different position than those as a determination basis of the distance to the vehicle (preceding vehicle) can be made, irrespective of the shape of the vehicle (preceding vehicle) and background. Consequently, the coordinates of the lateral ends of the vehicle can be determined.

Seventh Embodiment

Next, a distance measuring apparatus in a seventh preferred embodiment according to the present invention will be described below.

The seventh embodiment is a combination of the distance measuring apparatus which measures the distances to the respective ends of the target object as described in each of the first through sixth embodiments and a device which determines whether the vehicle on which the distance measuring apparatus is mounted should be forwarded or should be guided to another traffic lane on the basis of the result of measurement in the distance measuring apparatus.

In details, using the position measuring apparatus described in each embodiment described above, the distance from the position measuring apparatus to the target object (for example, the preceding vehicle) present in the forward detection zone and the positions of the lateral ends of the target object (for example, the preceding vehicle) are measured. The combined device determines, on the basis of the result of the determinations, a possibility of a collision against the preceding vehicle and a safe route of travel and determines whether the vehicle should be forwarded or should be guided to take an alternative route of travel.

The above-described device to determine at least one of the vehicular forwarding and alternative route guidance will be exemplified as follows:

For example, by comparing a lateral spatial width of the preceding vehicle photographed (for example, an adjacent traffic lane) with a width of the vehicle itself, the device determines whether it is possible for the vehicle to pass aside the preceding vehicle. If it is possible, the device indicates that the vehicle is permitted to run and pass aside the preceding vehicle through, e.g., a (TV (television)) monitor unit 12 in FIGS. 1A and 1B and, judging from the corresponding lateral end position of the preceding vehicle photographed, the device determines a course for the vehicle to allow a safety pass aside the preceding vehicle as the route of travel. Such a device as described above can be used. Then, the result of determination by the above described device is displayed on a display such as the TV monitor unit 12 shown in FIGS. 1A and 1B and, judging from the corresponding lateral end position of the preceding vehicle photographed, the device determines a course for the vehicle to allow a safety pass aside the preceding vehicle as the route of travel. Such a device as described above is displayed on a display such as the TV monitor unit 12 in FIGS. 1A and 1B (constituted by the liquid crystal display) or is provided to an automatic steering system as the route information. On the other hand, if it is not possible (negative) to run aside the preceding vehicle, the device controls a brake controlling system to decelerate or stop the vehicle.

As a practical matter of fact, it is generally difficult to determine the positions of the lateral ends of the vehicle from among the vertical edges detected from the whole image since, in the case of the vehicle, the length of the vertical edge is shorter than that of the horizontal edge. For example, it is difficult to distinguish the vertical edges on the vehicle from the white line on the road and an edge of a road only by the determination from the edge detections.

On the other hand, a precision of the lateral end position detection from the range image is coarse since the lateral end positions are determined only in the unit of window. Furthermore, even if the parallax value is calculated for each pixel (each dot) and the lateral end positions are determined in the units of pixels, the regions in each of which the parallax value becomes unstable due to the problem of occlusion provides the lateral end positions, as described in the second embodiment. Hence, in the same way as described in the case of the edge detection, the lateral end positions of the vehicle cannot accurately be determined only by the determination from the result of voting to the table of parallax x lateral position. Especially, a situation in which the lateral end positions of the vehicle is required to be accurately determined is, in many cases, the case wherein the preceding vehicle is present in the relatively close distance to the vehicle. For example, such a situation as described above occurs when the device determines whether the vehicle should run and pass aside a parked vehicle (corresponds to the preceding vehicle described above) at an alley on which the vehicle is parked or when the device determines to brake the vehicle when an obliquely forwarding vehicle moves gradually his car sideways to interrupt the forward run of the vehicle during a traffic congestion.

However, in a conventional method, even if the lateral end position range detection is carried out from the table of parallax×lateral position derived for each window as well as the edge detection, it is difficult to accurately detect the lateral end position of the vehicle due to the problem of occlusion which naturally occurs due to the presence of the vehicle at the close distance.

However, in the distance measuring apparatus according to the present invention, the detection of the ends of the vehicle (the preceding vehicle) is carried out not only from the positions derived from the range image described above but also from the following procedure.

Firstly, the horizontal edges relatively easy to be detected are detected with the range of detection restricted on the approximate range in which the vehicle would have been photographed derived from the range image. Thereafter, the vertical edges located on the left and right ends of the vehicle which would generally be difficult to be detected and whose lengths are relatively short are detected only within the range whose upper and lower limits correspond to the horizontal edges constituting the upper and lower ends of the vehicle. At this time, several vertical edges including those corresponding to the lateral ends of the vehicle (the preceding vehicle) are detected. The vertical edges which are located in the vicinity of both ends of the approximate range derived from the range image are selected from those several vertical edges. Thus, the accurate detection of the lateral end edges which would be difficult to be detected from the mere edge detection or from the range image can be achieved.

In addition, in the distance measuring apparatus according to the present invention, the edge detection range and the edge selection range are approximate range derived as the same distance derived through the stereophotographic image processing. The accurate distance measuring processing becomes possible which is not dependent upon (not influenced by) such a surrounding situation except the vehicle as the background, a road surface condition, and a presence or absence of the shadow on the road surface and the white line.

Furthermore, utilizing such a characteristic of the image on a vehicular body surface that there are less numbers of textures (patterns on a surface of an object which would naturally be present; for example, grains; and different from noises) and edges and, in a case where the vehicular body surface is photographed continuously in time, a change in luminance (a change in intensity) is extremely small, after the vertical detection for the later processing is restricted on the range (range B) covering the vehicle (the preceding vehicle's body) derived from the range image and the horizontal edge processing, the average value in the luminance for each x-axis coordinate position is calculated continuously in time. Thereafter, the distance measuring apparatus can preferably determine that the range in which the time variance is small is within the vehicle body.

The more accurate determination of the positions of the lateral ends of the vehicle (the preceding vehicle) can be achieved with both of the approximate positions derived from the range image and the range in which the time variance of the luminance average value derived for each x-axis coordinate position indicates the relatively small value taken into consideration when the edges positioned on the lateral ends of the vehicle (the preceding vehicle) are selected from those edges detected within the range in which the vehicle (the preceding vehicle) is positively present.

Next, specific examples of the sterophotographic image processing carried out in each embodiment of the distance measuring apparatus according to the present invention will be described below with reference to a corresponding flow-chart.

Figure 14:
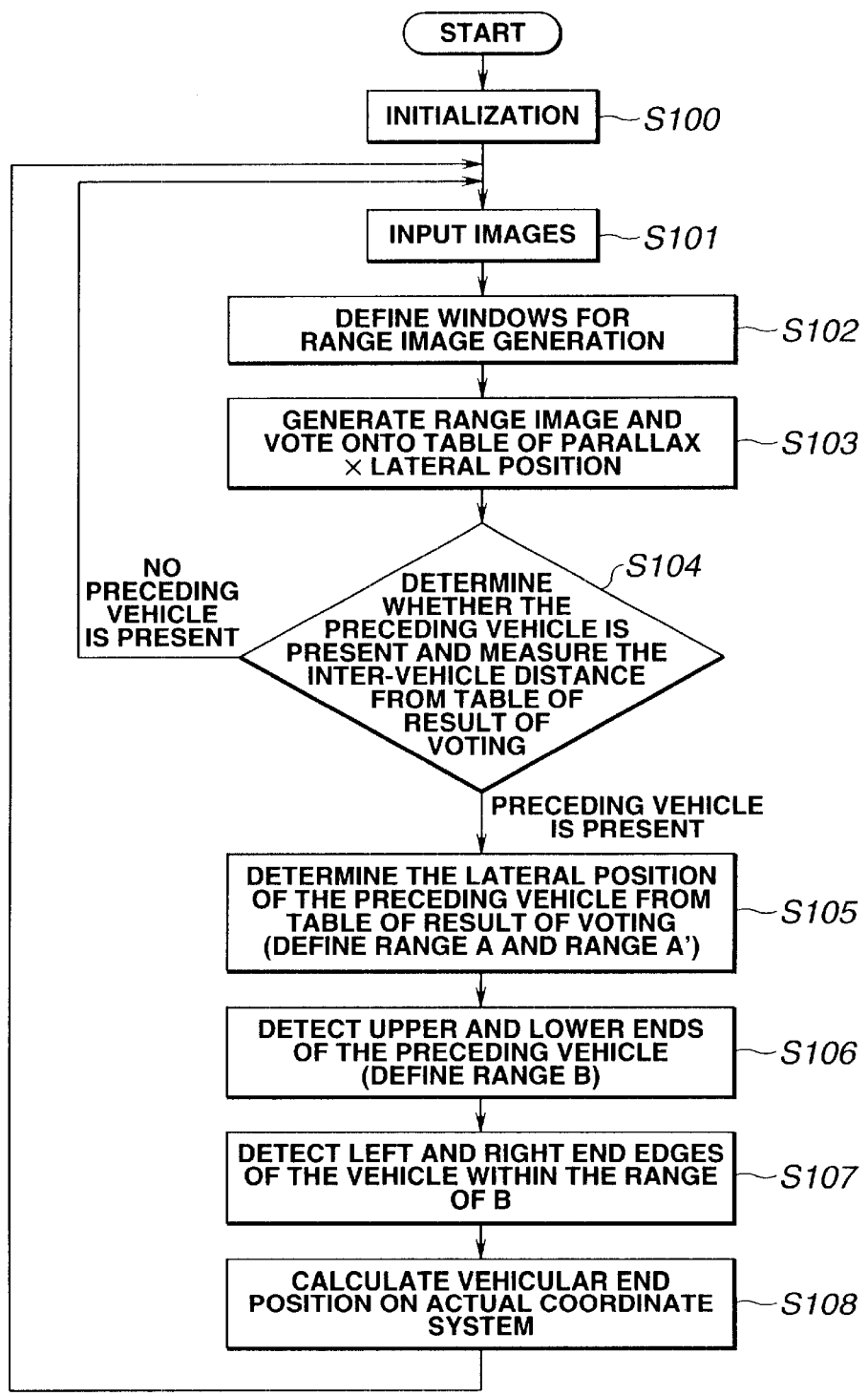
FIG. 14 is an operational flowchart for explaining an operation of a specific first example of an execution by the position measuring apparatus shown in FIG. 1B.

FIG. 14 shows a first example of the processing flow-charts.

In this example, the pair of cameras 1 and 2 are aligned in the lateral direction with respect to the road surface in parallel to each other and the Y axis of each of two cameras 1 and 2 are is arranged on the same line. The pair of cameras 1 and 2 are also called stereo cameras. This arrangement of the stereo cameras is shown in FIGS. 2A and 2B.

In FIG. 14, at a first step S100, the CPU 13 shown in FIG. 1B executes initializations of the histograms and table of the parallax value versus lateral positions (Parallax×Lateral Position).

At the next step S101, the CPU 13 fetches the image A and the image B of the stereophotographic images.

At the next step S102, the CPU 13 defines the windows on one of the two images A or B. In this example, as shown in FIGS. 4A through 4D, ten in longitudinal direction of the one imege×twenty in the lateral direction thereof (,i.e., 10×20 numbers of) windows are defined.

At the next step S103, the CPU 13 calculates the parallax value for all of the windows defined on the one image A or B.

As explained with reference to FIGS. 5A through 5C, the voting to the table of parallax value versus lateral positions (Parallax×Lateral Position) is carried out. The normalized correlative coefficient method or difference method may be used in the image matching for the range image generation.

Next, at a step S104, the CPU 13 determines whether the preceding vehicle is present or absent in the forward detection zone on the basis of the high value indicating positions in the table of the results of voting using the result of voting to the table of parallax x lateral position and calculates the distance to the preceding vehicle according to the parallax value if the preceding vehicle is determined to be present, as described with reference to FIGS. 6A through 6C. if the preceding vehicle is determined to be absent, the routine returns to the step S101 to receive the subsequent images (image A and image B). If the preceding vehicle is determined to be present, the routine goes to a step S105.

Next, at a step S104, the CPU 13 determines whether the preceding vehicle is present or absent in the forward detection zone on the basis of the high value indicating positions in the table of the results of voting to the table of parallax× lateral position and calculates the distance to the preceding vehicle according to the parallax value if the preceding vehicle is determined to be present, as described with reference to FIGS. 6A through 6C.

If the preceding vehicle is determined to be absent, the routine returns to the step S101 to receive the subsequent images (image A and image B). If the preceding vehicle is determined to be present, the routine goes to a step S105.

At the step S105, the CPU 13 determines the lateral end positions of the preceding vehicle. This determination of the lateral end position may be carried out in the method described with reference to FIGS. 7A through 7C.

It is noted that, in the case where the method described in the second embodiment is used at the step S105, the lateral end positions determined for each processing operation are stored in a memory location (such as RAM 15) by several number of times of the past updating the contents of the memory location for every number of times. Then, the CPU 13 determines the assured range A within which the preceding vehicle has continuously been photographed in this past several number of times and determine& the candidate range A' within which the preceding vehicle has been photographed not continuously in time but the predetermined number of times (for example, five number of times (fifth)) or more by about half stored numbers (the probability of the candidate range A' is lower than the assured range A).

Next, at a step S106, after the assured horizontal range A is determined at the step S105, the CPU 13 detects the horizontal edges present within the assured range A to determine the upper and lower ends of the vehicle. As shown in FIGS. 8A, 8B, and 8C, the CPU 13 calculates the absolute value of the horizontal differentiation on the luminance for each pixel within the range A and produces the histogram on the horizontal differentiation value for each y-axis coordinate position.

Suppose now that the histogram on the horizontal differentiation value at y=yp is Hh (yp), the absolute value of the horizontal differentiation at a point (x, yp) is |dIy (x, yp)|, a start point of the range A is xs, and an end point thereof is xe. Then, the histogram value (called, a frequency) Hh(yp) can be derived in the following equation (5).

$$Hh(yp) = \sum_{x=xs}^{xe} |dIy(x, yp)|. \quad (5)$$

The absolute value of the horizontal differentiation value |dIy(x, yp)| may be determined as the absolute value on the result of a convolution with a SOBEL's operator as shown in FIG. 15A.

Although the histogram on the horizontal edges is a very effective detection method for the upper and lower ends of the vehicle (the preceding vehicle), almost no objects other than the preceding vehicle may be determined to be present within the range A, as appreciated from FIGS. 8A through 8C. Hence, as described in the third embodiment, the horizontal straight lines may be determined according to the generally available straight line detection method such as the Hough conversion (transformation) within the range A.

The straight lines on the upper and lower ends of the vehicle (the preceding vehicle) are selected from several horizontal straight lines detected in the above-described method in order to restrict the detection range of the lateral end edges of the subsequent processing. Since, usually, an image region above the upper end of the vehicle (the preceding vehicle) indicates a sky region, another image region below the lower end of the vehicle (the preceding vehicle) indicates the road surface zone, and the vehicle has normally long horizontal edges, two horizontal edges may properly be selected which produce a region having a magnitude (dimension) sufficient to produce the other histogram for the subsequent processing.

However, to assure the determination of the lateral end edges of the (preceding) vehicle and to prevent the erroneous detection of the footbridge on the road surface, it is more accurate to use the method described in the fourth embodiment.

At this time, as shown in FIGS. 12A through 12B, y-axis coordinate approximate values HU and HD are previously determined within which the vehicle (the preceding vehicle) would be photographed on the basis of the distance by which the vehicle is discovered according to the equation (5). Then, the edges detected in the vicinity of HU and HD may be selected. The upper end edge (y=yu) determined by this method and the lower end edge (y=ya) determined by this method provide the upper limit and lower limit of the range B.

Next, at a step S107, the CPU 13 determines the left and right lateral end positions of the preceding vehicle on the image by detecting the longitudinal edges included within the range B. The process at the step S107 is as follows: The CPU 13 determines the absolute value of the vertical differential value on the luminance within the range B and produces the histogram on the differential value within the range B for each y-axis coordinate position.

Suppose that the histogram on the vertical differential value at y=yp is Hv(xp), the absolute value of the vertical differentiation at the point (xp, y) is |dIx(xp, y)|, the start point of the range B is yu, and the end point thereof is yd. The histogram value Hv(xp) s determined in the following equation (6).

$$Hv(xp) = \sum_{y=yu}^{yd} |dIx(xp, y)| \quad (6)$$

The absolute value of the vertical differential value is determined as the absolute value of the result of the convolution with the SOBEL's operator as shown in FIG. 15B.

The straight lines of the left and right ends are selected from several vertical straight lines detected b such a method as described above.

The approximate lateral portions of the vehicle (the preceding vehicle) have already been determined from the result of determination using the table of parallax value× lateral position.

Figure 16A:
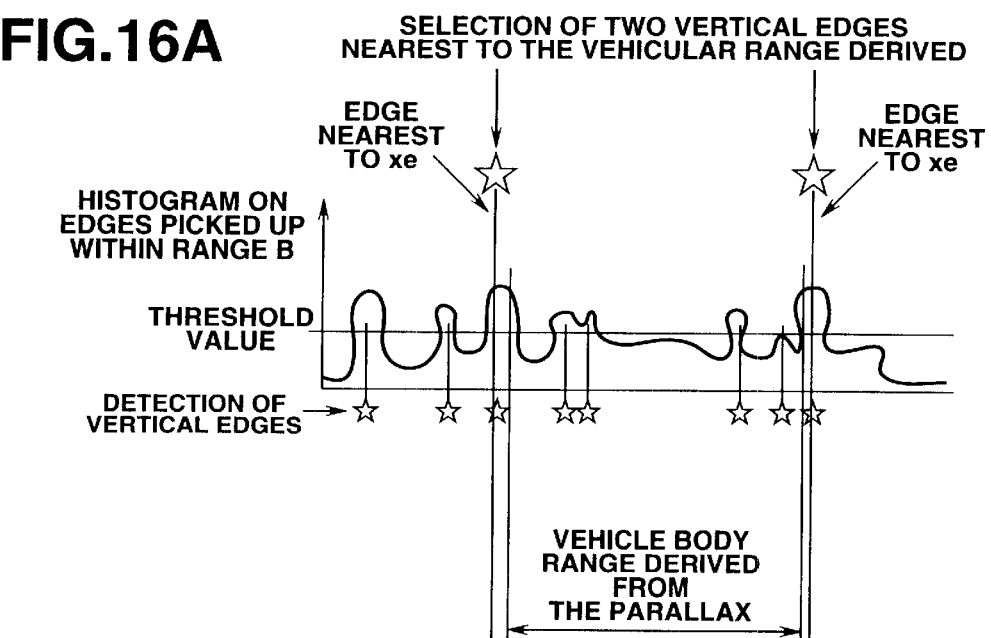
FIGS. 16A and 16B are explanatory views for explaining an example of a method of selecting vertical edges in the case of the specific first example of FIG. 14.
Figure 16B:
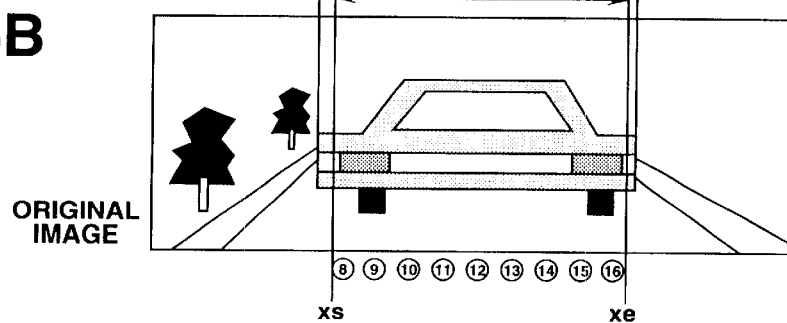

As shown in FIGS. 16A and 16B, the straight lines on the left and right ends of the (preceding) vehicle may be selected from those edges detected within the range B which are located in the vicinity of both ends of the range detected from the table of parallax×lateral position.

In addition, when the preceding vehicle is located on the road surface in the close distance to the vehicle, the vehicular body range determined on the basis of the parallax becomes unstable due to the problem of occlusion explained with reference to FIG. 12.

Therefore, as described in the sixth embodiment, the edges located in the vicinity of x=xlr and x=xrr in FIG. 12 in the case of the right side image and located in the vicinity of the range placed between the assured range A and the candidate range A' described above.

Figure 17A:
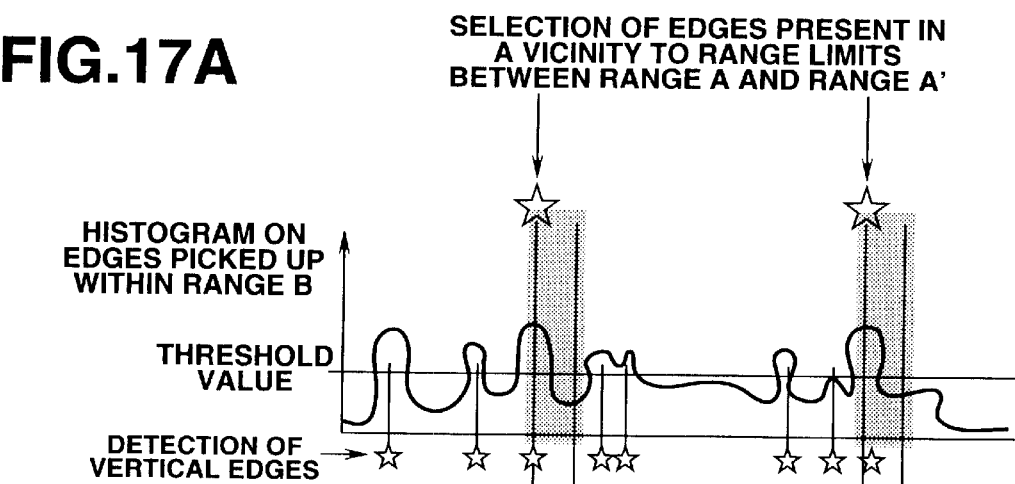
FIGS. 17A and 17B are explanatory views for explaining another example of the method of selecting vertical edges in the case of the specific first example of FIG. 14.
Figure 17B:
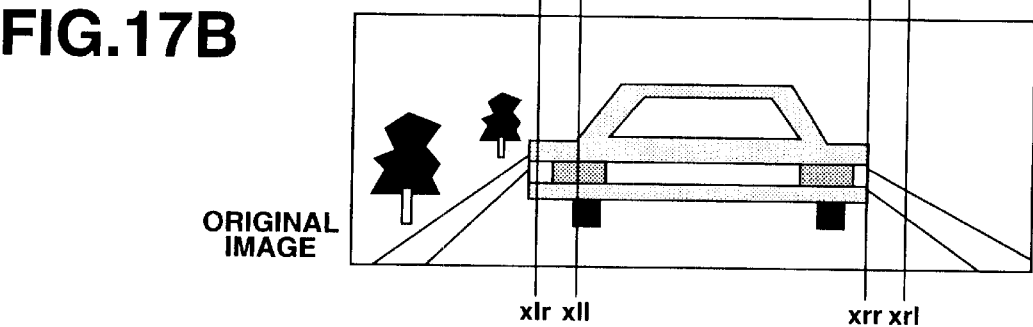

This state is shown in FIGS. 17A and 17B.

Next, referring back to FIG. 14, at a step S108, the CPU 13 determines the lateral position of the preceding vehicle with respect to the camera setting position in a real coordinate system on the basis of the lateral end positions of the (preceding) vehicle on the image determined in the process of the step S107.

Specifically, according to the relationship shown in FIG. 11, the positions of the vehicular body ends located in the forward detection zone in the real coordinate system can be determined according to the equation (3) using the coordinates of the lateral ends on the image detected on the right side image or on the left side image.

Figure 18:
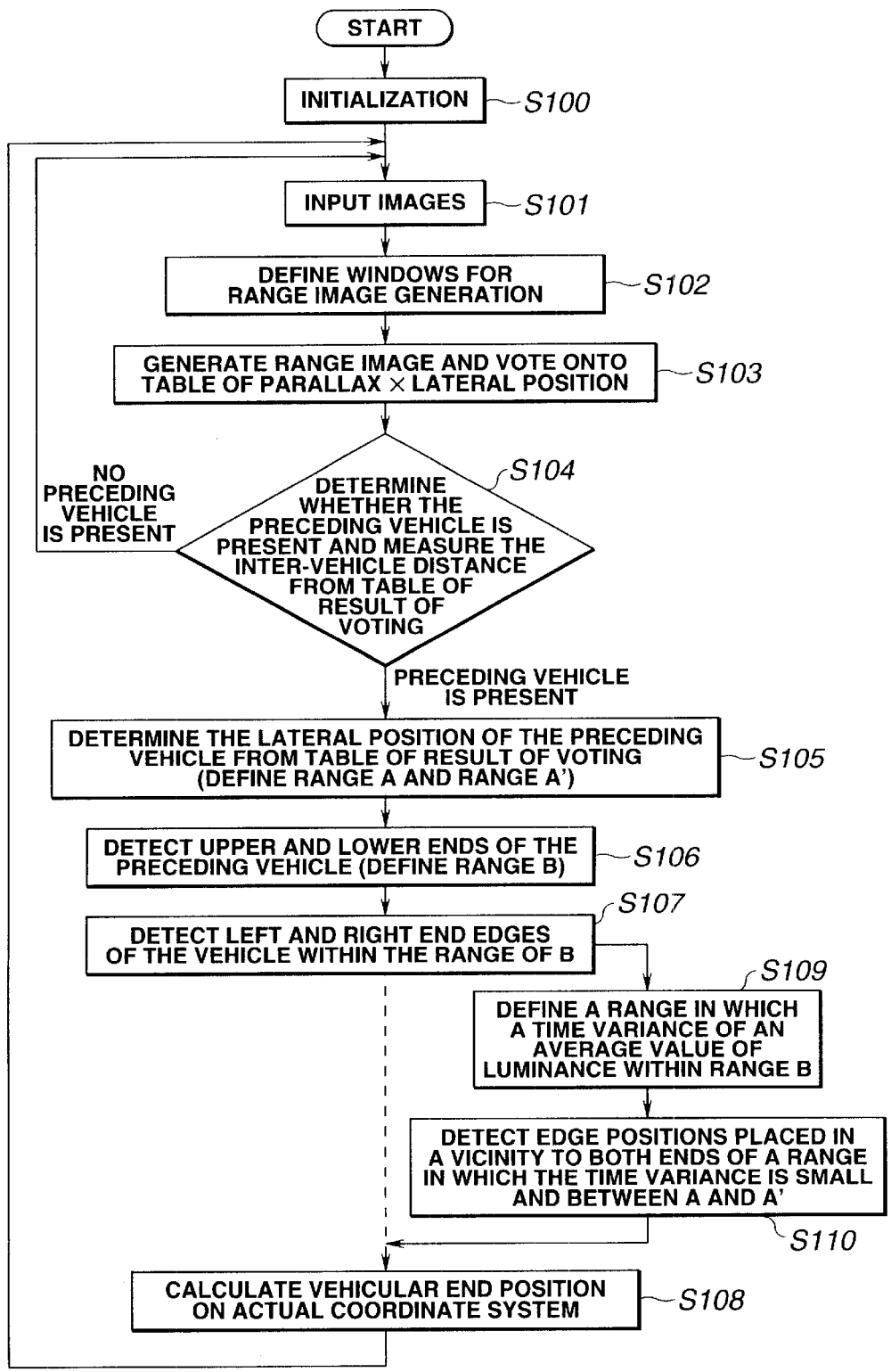
FIG. 18 is an operational flowchart for explaining an operation of a second specific example of an execution by the distance measuring apparatus according to the present invention.

Next, FIG. 18 shows a processing flowchart of another specific example of execution by the distance measuring apparatus according to the present invention.

In the other example shown in FIG. 18, the steps S100 through S106 (the initializations and determination of the range B) are the same as those shown in FIG. 14 and steps S109 and S110 are added to the steps shown in FIG. 14.

The preceding vehicle has short vertical edges as compared with the horizontal edges. Hence, in such a scenery that many longitudinal edges are included in the background such as surrounding trees and buildings, it is often the case that the detected positions become unstable (fluctuated) only by the detection of the vertical edges within the range B. The fifth embodiment provides a method for coping with such a scenery as described above and corresponds to the steps S109 and S110.

In a case where the vehicle is running behind one preceding vehicle to follow up the preceding vehicle, the image on the background changes with time but the luminance on the part of the image at which the vehicle is photographed does not change. Especially, since the vehicular body has almost no texture but is uniform, the variation of the luminance of the vehicular body images photographed continuously in time is quite less. The variation in the luminance distribution on the vehicle part is slight as compared with the background. The same thing goes on not only a case where the background is changed during a run of the vehicle but also the case where the vehicle is repeatedly stopped as during the traffic congestion.

That is to say, the background includes many objects such as leaves on trees which move due to a wind blow and such as surrounding pedestrians who move irrespective of the running state of the vehicle. Such an artificially uniform painted surface as the vehicular body is photographed as an uniform luminance regardless of a minute change in an angle through which a light is hit on the vehicular body. However, the change in the luminance on such a part of the image which has the feature as the road surface or the wall occurs due to the minute change in light beams or due to a minute change of an angle through which the cameras are directed to take photographs.

Figure 19A:
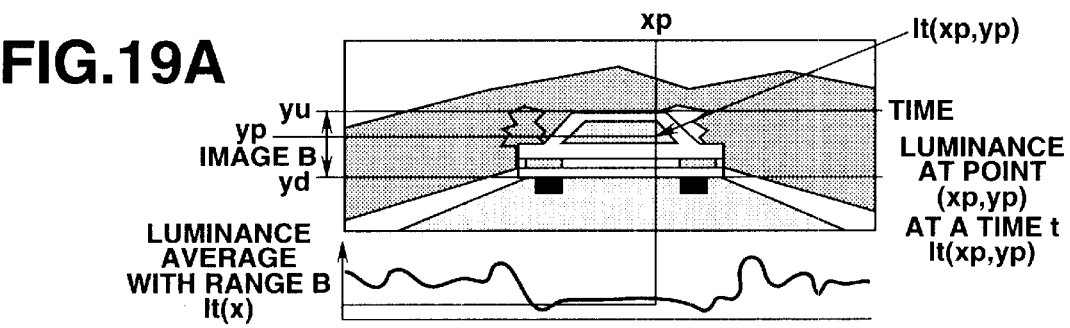
FIGS. 19A, 19B, 19C, and 19D are explanatory views for explaining an example of the method of selecting the vertical edges with a time variance and ranges A and A' taken into consideration in the case of the specific second example of FIG. 18.
Figure 19B:
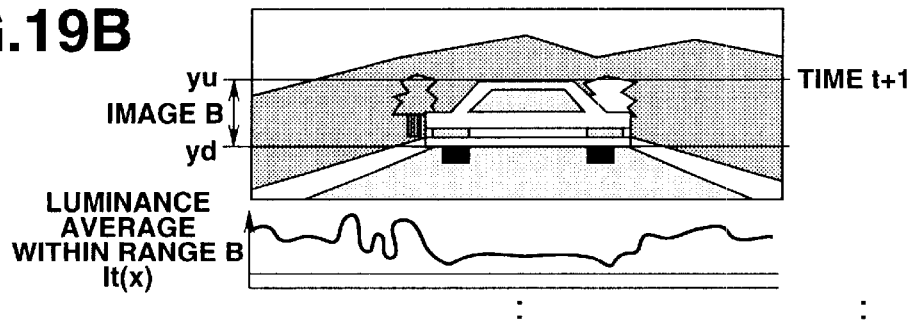
Figure 19C:
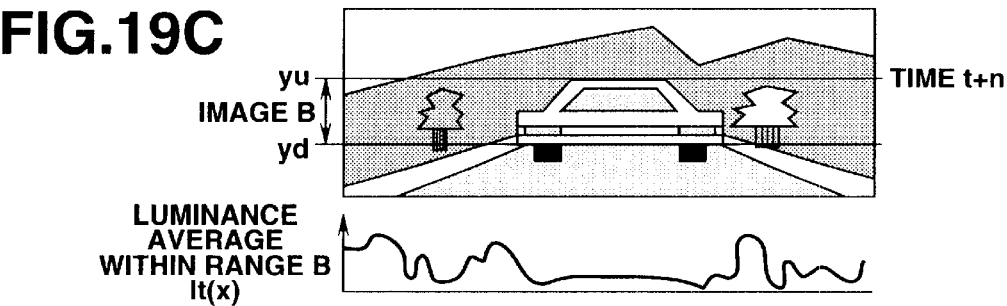
Figure 19D:
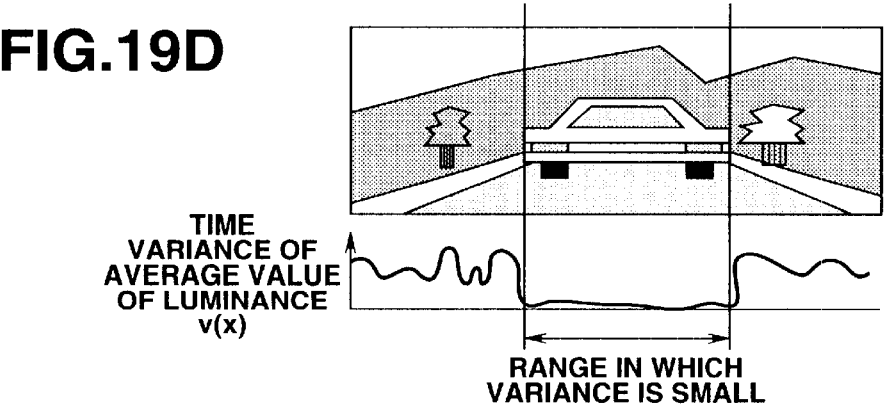

FIGS. 19A, 19B, and 19C shows the states in which the average value of the luminance for each x-axis coordinate position within the range B in the continuous processing at a time t, t+1, - - -, t+n (n denotes an arbitrary integer). FIG. 19D shows a graph representing the variance of the luminance average value within the range B determined for each x-axis coordinate position at each of processes carried out continuously in time by the n-th number of times.

Suppose now that the luminance at a point (x, y) of the image photographed at the time T is It(x, y), the y-axis coordinate on the upper limit of the range B is yu, and that one the lower limit on the range B is yd. Then, the average value It (xp) of the luminace at x=xp can be determined in the following equation (7).

$$It(xp) = 1/(yu - yd) \cdot \sum_{y=yd}^{yu} |dIt(xp, y)| \quad (7)$$

In addition, the variance Vt(xp) of the average value in the luminance calculated between the time t−n and the time T can be determined in the following equation (8).

$$Vt(xp) = 1/n \times \sum_{i=t-n}^{t} [It(xp) - AVE]^2 \qquad (8)$$

In the equation (8), $$AVE = 1/n \times \sum_{i=t-n}^{t} Ii(xp).$$

Since each value used when the average value of the luminance AVE is calculated is restricted on the range covering the upper and lower ends of the (preceding) vehicle, only the luminance on the (preceding) vehicle is added onto the x-axis coordinates over which the vehicular body (the preceding vehicle) is photographed.

Since neither the texture nor the edge is present on the vehicular body, the variation in the luminance is less even if the light intensity is more less varied and the vehicular body photographed position is more or less changed.

Hence, in a case where the average value in the luminance on the vehicle continuously in time is determined by using the equation (8), the result of the calculation of the equation (8) indicates almost no change with time.

On the other hand, in the case where a part of the image on which any objects other than the vehicle (the preceding vehicle) are photographed, the average value of the luminance is varied with time even if the case where the vehicle on which the pair of cameras 1 and 2 described above is stopped. This is because the angle through which the light beams are directed toward the background green plants, the surrounding pedestrians, and fine textures on the road surface is varied.

Therefore, the range in which the calculated variance is relatively small can be deemed to be the range in which the vehicle (the preceding vehicle) is photographed, as shown in FIGS. 19A through 19D.

In addition, the CPU 13 determines the average value of the luminance not a total value of the luminance, at the step S109.

That is to say, the width of the range B (the length between yu and yd) is varied according to an inter-vehicle distance from the vehicle to the preceding vehicle.

However, the range B is determined according to the dimension of the preceding vehicle on the image. Hence, the step S109 can be applied to the case where the dimension of the vehicle (the preceding vehicle) on the image is varied.

Next, at the step S110 in FIG. 18, the CPU 13 selects the edges present in the vicinity of both ends of the range in which the variance calculated in the equation (8) is relatively small and present in the vicinity of the space between the range A and the range A' determined at the step S104 as the lateral ends of the vehicle (the preceding vehicle) using the result of the calculation of the variance of the average value in the luminance and the result of edge detection carried out at the step S107.

Consequently, it becomes possible for the distance measuring apparatus to perform a robust detection of the lateral end positions with no receipt of the influence of the surrounding environment.

Figure 21B:
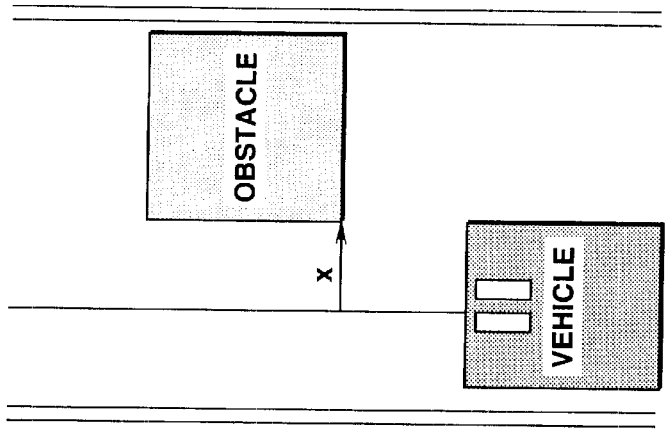
FIGS. 21A and 21B are explanatory views for explaining examples of applications of the distance measuring apparatus combined to the present invention combined with a pass-aside determination device for a mobile body such as an automotive vehicle.
Figure 21A:
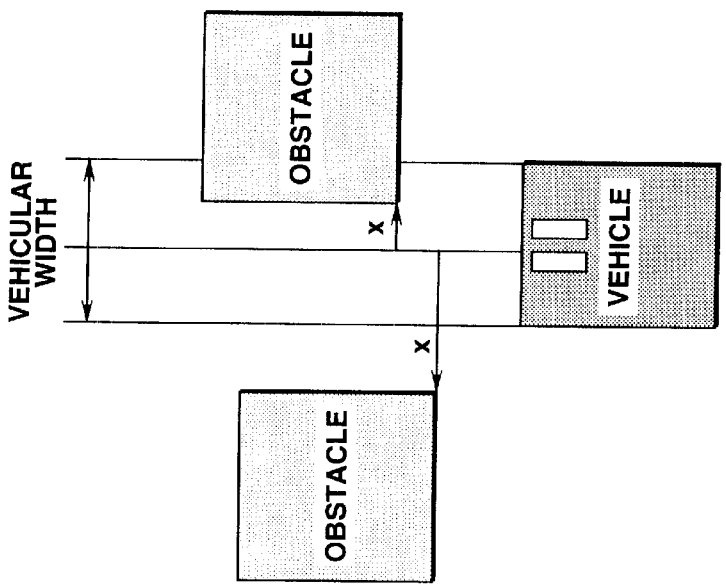

Next, FIGS. 21A and 21B show explanatory views for explaining examples of application of the distance measuring apparatus and the combined device described in the seventh preferred embodiment according to the present invention.

FIG. 21A shows a situation in which the device determines whether the vehicle can safely be forwarded without collision in a case where other vehicles are running or standing randomly in front of a toll-gate (the traffic congestion occurs in front of the toll-gate).

Since the distance measuring apparatus according to the present invention can accurately detect the lateral end positions of the obstacle (the preceding vehicle) or the obstacles, the device can determine whether the vehicle can safely be forwarded by comparing the width aside the obstacle(s) with the lateral width of the vehicle on which the distance measuring apparatus is mounted. The result of the determination by the device is displayed on a screen of the liquid crystal display mounted in the vehicle so as to produce the determination result to the vehicular driver. In addition, in a case where, for example, its right end of the vehicle has a possibility of being contacted with one of the standing obstacles (refer to FIG. 21A), this possibility may be displayed and the device may issue an instruction to shift the vehicle in the leftward direction. Hence, the device may issue a display command to the liquid crystal display to display the possible route of travel. Furthermore, the device can be used to automatically operate the vehicular brake system to control the deceleration and brake of the vehicle.

FIG. 21B shows another situation in which the vehicle enters the alley in which the parked vehicle is present.

In this situation, the distance measuring apparatus can determine one lateral end of the parked vehicle (this serves as the preceding vehicle) so that the device can determine whether the vehicle can be forwarded without collision against the parked vehicle.

It is noted that (note 1) in FIG. 6C describes that the windows whose y axis coordinate positions have the mutually same value are determined to indicate the same parallax values if no object is present, (note 2) in FIG. 12 describes that the result of detection indicates unstable (there are two cases of the edge detection, i.e., if the edge is present on the background, the parallax on the background is taken whereas the parallax on the preceding vehicle is taken), (note 3) in FIG. 12 describes that the result of detection indicates unstable, (note 4) in FIG. 12 describes that there is a tree's trunk at the side of the (preceding) vehicle on the left side image, (note 5) in FIG. 20A describes that the vicinity of an image zone interposed between the range A and the range A', (note 6) in FIG. 20A describes that the vicinity of each of both ends of the range over which the average value on the luminance indicates a small value, and (note 7) in FIG. 4A describe that shifting a scanning range (L pixels) by one image, the similarity to any one of the windows defined on the right side image is determined and any position at which the highest similarity is indicated is used for the parallax determination.

It is also noted that each image split region recited in the claims corresponds to each window shown in FIG. 4A, the lateral edges mean laterally oriented edges, and the longitudinal edges means longitudinally oriented edges.

The entire contents of a Japanese Patent Application No. Heisei 10-311903 (filed in Japan on Dec. 2, 1998) are incorporated herein by reference.

Although the invention has been described above by reference to certain embodiments of the invention, the invention is not limited to the embodiments described above, modifications and variations of the embodiments described above will occur to those skilled in the art in light of the above teachings.

The scope of the invention is defined with reference to the following claims.

What is claimed is:

1. A position measuring apparatus, comprising:

a pair of electronic cameras mounted on a mobile body, optical axes of both of the cameras being mutually parallel to each other and being directed toward a forward direction of the mobile body or toward a rearward direction thereof and horizontal axes of their photograph planes being aligned to the same line;

an image split region setting section to split one image photographed by one of the pair of cameras into a plurality of image split regions, each image split region having a predetermined dimension;

a parallax calculating section to determine, for each image split region, a similarity in image between an image present within one of the image split regions and another image photographed by the other of the pair of cameras and present on each position corresponding to one of the image split regions and to calculate, for each image split region, a difference in position between a position of each of the image split regions and any one of the positions of the other image at which the similarity in image to the image on the position of each image split region is highest, the parallax calculating section deriving a parallax for each image split region from the calculated difference in position therebetween;

a voting section, the voting section including a table whose lateral axis is made correspondence to a horizontal position for each image split region and whose longitudinal axis is made correspondence to a value of the parallax for each image split region and accumulatively adding a predetermined numerical value to each position in the table corresponding to both of the horizontal position of each image split region and a value of the parallax at the corresponding image split region of the same horizontal position so as to vote to each position in the table;

a distance calculating section to calculate a distance from a camera setting position of the pair of cameras to a target object to be detected present in either the forward direction or the rearward direction on the basis of the value of the parallax at any one of the horizontal positions in the table at which a result of voting by the voting section indicates a value higher than a first threshold value;

a horizontal range calculating section to derive a horizontal range on the one image over which the target object to be detected is photographed on the basis of the horizontal positions of the respective image split regions corresponding to any positions in the table at each of which the result of voting by the voting section indicates the value higher than the first threshold value;

a vertical range calculating section to derive first histograms on horizontal edges for each vertical coordinate value on the whole image within the horizontal range derived by the horizontal range calculating section and to derive a vertical range at each end of which a histogram value of the first histograms indicates a value higher than a second threshold value;

an edge selecting section to derive second histograms on vertical edge components for each horizontal coordinate value on the whole image within the vertical range derived by the vertical range calculating section, to search for longitudinal edges present on the one image determined from the second histograms, and to select any one of the longitudinal edges which is located in the vicinity of each end of the horizontal range derived by the horizontal range calculating section from among the searched longitudinal edges; and an actual position calculating section to derive an actual spatial position on each lateral end of the target object present in either the forward or rearward direction with respect to the camera setting position, each lateral end thereof corresponding to the selected longitudinal edge on the one image, on the basis of the distance from the camera setting position to the target object derived by the distance calculating section and the coordinate value of each longitudinal edge selected by the edge selecting section.

2. A position measuring apparatus as claimed in claim 1, wherein the horizontal range calculating section includes: a first determinator to determine an assured horizontal range A within which the photograph of the image of the target object to be detected is perfectly assured, the assured horizontal range A being determined by the first determinator in such a manner that when a horizontal range calculating process of deriving the horizontal range on the one image in which the target object to be detected is photographed on the basis of the horizontal positions corresponding to any positions in the table at each of which the result of voting by the voting section indicates the value higher than the first threshold value is repeated for a predetermined period of time, the image of the target object to be detected is determined to be present within the assured horizontal range A continuously in time within the predetermined period of time; and a second determinator to determine a candidate horizontal range A' within which the photograph of the image of the target object to be detected is assured with less probability than the assured horizontal range A, the candidate horizontal range A' being determined by the second determinator in such a manner that when the horizontal range calculating process is repeated for the predetermined period of time, the image of the target object to be detected is determined to be present within the candidate horizontal range A' not continuously in time but a predetermined number of times or more within the predetermined period of time, and wherein the vertical range calculating section derives the first histograms on the horizontal edges for each vertical coordinate value on the whole image within the assured horizontal range A.

3. A position measuring apparatus as claimed in claim 2, wherein the vertical range calculating section includes a searching section to search for the horizontal edges present within the assured horizontal range A to derive the vertical range B.

4. A position measuring apparatus as claimed in claim 2, wherein, when deriving the vertical range B, the vertical range calculating section derives approximate vertical coordinate positions HU and HD at which upper and lower ends of the target object to be detected are photographed on the image on the basis of the distance from the camera setting position to the target object derived by the distance calculating section, a focal length of each of the pair of the cameras, a height by which the pair of cameras are mounted on the mobile body, and a preset value of a height of the target object to be detected previously set according to an approximate height which is expected from a general dimension of the target object and selects vertical coordinate positions located in the vicinity of the approximate vertical coordinate positions HU and HD from among those at each of which the histogram value of the first histograms on the horizontal edges indicates the value higher than the second threshold value as respective ends of the vertical range B.

5. A position measuring apparatus as claimed in claim 3, wherein, when deriving the vertical range B, the vertical range calculating section derives approximate vertical coordinate positions HU and HD at which upper and lower ends of the target object to be detected are photographed on the image on the basis of the distance from the camera setting position to the target object derived by the distance calculating section, a focal length of each of the pair of the cameras, a height by which the pair of cameras are mounted on the mobile body, and a preset value of a height of the target object to be detected previously set according to an approximate height which is expected from a general dimension of the target object and selects vertical coordinate positions located in the vicinity of the approximate vertical coordinate positions HU and HD from among those at each of which the corresponding horizontal edge for which the vertical range calculating section is searched within the assured horizontal range A as respective ends of the vertical range B.

6. A position measuring apparatus as claimed in claim 2, wherein the edge selecting section includes: an average calculator to calculate an average value of a luminance on each vertical coordinate value aligned in the same horizontal coordinate position within the vertical range B for each horizontal coordinate position; and a first range determinator to determine a first horizontal range over which the average values calculated for the respective horizontal coordinate positions each of which is smaller than a predetermined average value are continued within the predetermined period of time as a second horizontal range over which at least one longitudinal edge is present.

7. A position measuring apparatus as claimed in claim 6, wherein the edge selecting section selects any one of the longitudinal edges which is located in the vicinity of each of both ends of the first horizontal range and which is located in the vicinity of an image zone interposed between the assured horizontal range A and the candidate horizontal range A'.

8. A position measuring apparatus as claimed in claim 2, wherein the edge selecting section includes: an variance calculator to calculate an average value of a luminance on each vertical coordinate value aligned in the same horizontal coordinate position within the vertical range B for each horizontal coordinate position and to calculate a variance of the average value of the luminance thereon; and a first range determinator to determine a first horizontal range over which the variances of the average values calculated for the respective horizontal coordinate positions each of which is smaller than a predetermined variance value are continued within the predetermined period of time as a second horizontal range over which at least one longitudinal edge is present.

9. A position measuring apparatus as claimed in claim 2, wherein the vertical range calculating section derives the first histograms on an absolute value of horizontal differentiation to a luminance on each vertical coordinate value within the assured horizontal range A and wherein the edge selecting section derives the second histograms on an absolute value of vertical differentiation to the luminance on each vertical coordinate value within the vertical range derived by the vertical range calculation section.

10. A position measuring apparatus as claimed in claim 1, wherein the mobile body is an automotive vehicle and further comprising a device to determine whether the vehicle on which the distance measuring apparatus is mounted is to be forwarded to approach to the target object of a preceding vehicle which is running ahead of the vehicle at the same traffic lane as the vehicle or to be passed aside the target object of the preceding vehicle according to a result of determination of the lateral ends of the target object of the preceding vehicle by the actual position calculating section.

* * * * *